(12) United States Patent
Choi et al.

(10) Patent No.: US 10,798,705 B2
(45) Date of Patent: *Oct. 6, 2020

(54) METHOD AND APPARATUS FOR OPERATING SUBFRAME AND TRANSMITTING CHANNEL INFORMATION FOR CONTROLLING INTERFERENCE IN COMMUNICATION SYSTEM

(71) Applicant: Samsung Electronics Co., Ltd., Suwon-si, Gyeonggi-do (KR)

(72) Inventors: Seunghoon Choi, Suwon-si (KR); Joonyoung Cho, Suwon-si (KR); Hyoungju Ji, Seoul (KR); Youngbum Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/201,459

(22) Filed: Nov. 27, 2018

(65) Prior Publication Data

US 2019/0150144 A1 May 16, 2019

Related U.S. Application Data

(63) Continuation of application No. 15/496,616, filed on Apr. 25, 2017, now Pat. No. 10,142,987, which is a (Continued)

(30) Foreign Application Priority Data

Apr. 12, 2011 (KR) ........................ 10-2011-0033916

(51) Int. Cl.
*H04W 72/04* (2009.01)
*H04L 1/00* (2006.01)
(Continued)

(52) U.S. Cl.
CPC ...... *H04W 72/0446* (2013.01); *H04B 7/2656* (2013.01); *H04L 1/0026* (2013.01); (Continued)

(58) Field of Classification Search
CPC ......... H04W 72/0446; H04W 72/0406; H04W 28/04; H04L 1/0027; H04L 1/0026; H04L 1/1822; H04L 1/1887; H04B 7/2656
(Continued)

(56) References Cited

U.S. PATENT DOCUMENTS 8,036,145 B2 10/2011 Power et al.
8,204,025 B2 6/2012 Cai et al.
(Continued)

FOREIGN PATENT DOCUMENTS

CN 1965513 A 5/2007
CN 101286792 A 10/2008
(Continued)

OTHER PUBLICATIONS

3GPP TSG-RAN WG1 #63bis. MediaTek Inc, Discussion on CQI Reference Resource [online], 3GPP TSG-RAN WG1#63b R1-110144, internet <URL: http://www.3gpp.org/ftp/tsg_ran/WG1_RL1/TSGR1_63b/Docs/R1-110144.zip> Dated Jan. 21, 2011. pp. 2-3.
(Continued)

*Primary Examiner* — Faisal Choudhury
(74) *Attorney, Agent, or Firm* — Jefferson IP Law, LLP

(57) ABSTRACT

A method and an apparatus for operating a subframe and transmitting channel information for controlling interference in a communication system are provided. If a macro evolved Node B (eNodeB) determines and reports an uplink protection subframe for suppressing uplink transmission to a neighboring eNodeB, transmits scheduling information for uplink data through a downlink subframe corresponding to an uplink protection subframe, and the uplink protection
(Continued)

subframe determined by the neighboring eNodeB is reported, a small eNodeB sets the reported uplink protection subframe as a flexible subframe, and uses the flexible subframe for downlink transmission. If the flexible subframe is used for the downlink transmission, a terminal of the small eNodeB measures and transmits non-period channel information in the flexible subframe through at least one uplink subframe.

16 Claims, 15 Drawing Sheets

Related U.S. Application Data continuation of application No. 13/445,041, filed on Apr. 12, 2012, now Pat. No. 9,635,584.

(51) Int. Cl.
  *H04L 1/18* (2006.01)
  *H04B 7/26* (2006.01)
  *H04W 28/04* (2009.01)
(52) U.S. Cl.
  CPC .......... *H04L 1/0027* (2013.01); *H04L 1/1822* (2013.01); *H04L 1/1887* (2013.01); *H04W 28/04* (2013.01); *H04W 72/0406* (2013.01)
(58) Field of Classification Search
  USPC ........................................................ 370/252
  See application file for complete search history.

(56) References Cited

U.S. PATENT DOCUMENTS

| | | | |
|---|---|---|---|
| 8,615,199 B2 | 12/2013 | Han et al. | |
| 8,868,089 B2 | 10/2014 | Lindbom et al. | |
| 8,903,006 B2 | 12/2014 | Ko et al. | |
| 2007/0230324 A1 | 10/2007 | Li et al. | |
| 2008/0137562 A1 | 6/2008 | Li et al. | |
| 2009/0190528 A1 | 7/2009 | Chung et al. | |
| 2009/0201838 A1 | 8/2009 | Zhang et al. | |
| 2009/0245169 A1 | 10/2009 | Zhang et al. | |
| 2009/0257366 A1 | 10/2009 | Power et al. | |
| 2010/0027446 A1 | 2/2010 | Choi et al. | |
| 2011/0019637 A1 | 1/2011 | Ojala et al. | |
| 2011/0032895 A1 | 2/2011 | Englund et al. | |
| 2011/0143749 A1 | 6/2011 | Guo et al. | |
| 2011/0176461 A1 | 7/2011 | Astely et al. | |
| 2011/0211503 A1 | 9/2011 | Che et al. | |
| 2011/0249578 A1 | 10/2011 | Nayeb Nazar et al. | |
| 2011/0249584 A1 | 10/2011 | Barbieri et al. | |
| 2012/0076017 A1* | 3/2012 | Luo ....................... | H04L 1/0026 370/252 |
| 2012/0076025 A1 | 3/2012 | Barbieri et al. | |
| 2012/0076028 A1 | 3/2012 | Ko et al. | |
| 2012/0076040 A1 | 3/2012 | Hoshino et al. | |
| 2012/0076105 A1* | 3/2012 | Yang ....................... | H04L 5/001 370/329 |
| 2012/0082049 A1 | 4/2012 | Chen et al. | |
| 2012/0082101 A1 | 4/2012 | Gaal et al. | |
| 2012/0092989 A1 | 4/2012 | Baldemair et al. | |
| 2012/0093012 A1 | 4/2012 | Pedersen et al. | |
| 2012/0157082 A1* | 6/2012 | Pedersen ............... | H04W 24/10 455/422.1 |
| 2012/0165029 A1 | 6/2012 | Lindbom et al. | |
| 2012/0201154 A1 | 8/2012 | Chandrasekhar et al. | |
| 2012/0300641 A1 | 11/2012 | Chen et al. | |
| 2013/0016686 A1 | 1/2013 | Li et al. | |
| 2013/0178221 A1 | 7/2013 | Jung et al. | |
| 2013/0235756 A1 | 9/2013 | Seo et al. | |
| 2013/0294352 A1 | 11/2013 | Park et al. | |
| 2014/0247749 A1* | 9/2014 | Kim ..................... | H04B 7/0626 370/252 |
| 2016/0150423 A1 | 5/2016 | Jeong et al. | |
| 2016/0323786 A1* | 11/2016 | Syed ................. | H04W 36/0061 |

FOREIGN PATENT DOCUMENTS

| | | |
|---|---|---|
| CN | 101558671 A | 10/2009 |
| CN | 101911523 A | 12/2010 |
| KR | 2009-0087043 A | 8/2009 |
| KR | 2009-0094752 A | 9/2009 |
| KR | 2009-0104188 A | 10/2009 |
| KR | 10-2010-0106364 A | 10/2010 |
| WO | 2010-049587 A1 | 5/2010 |
| WO | 2010-140298 A1 | 12/2010 |
| WO | 2011-034966 A | 3/2011 |

OTHER PUBLICATIONS

Japanese Office Action dated Apr. 22, 2019, issued in Japanese Application No. 2018-000274.
Catt, 'Remaining issues for transmission of aperiodic SRS.' 3GPP TSG RAN WG1 Meeting #63bis, R1-110053, Jan. 17-21, 2011.
New Postcom, Need and feasibility of using different uplink-downlink configurations for TDD HeNBs in Heterogeneous Networks [online], 3GPP TSG-RAN WG1#61b R1-103688, Jul. 2, 2010.
Chandrasekhar et al., CSI Measurement, Reporting and Collision-Handling in Rel-10, U.S. Appl. No. 61/440,444, filed Feb. 8, 2011.

* cited by examiner

FIG. 3

| | 0 | 1 | 2 | 3 | 4 | 5 | 6 | 7 | 8 | 9 | |
|---|---|---|---|---|---|---|---|---|---|---|---|
| TDD UL-DL Configuration 3 | D | S | U | U | U | D | D | D | D | D | 301 |

| | 0 | 1 | 2 | 3 | 4 | 5 | 6 | 7 | 8 | 9 | |
|---|---|---|---|---|---|---|---|---|---|---|---|
| | D | S | U | U | F 309 | D | D | D | D | D | 302 |
| | D | S | U | F 310 | F 311 | D | D | D | D | D | 303 |
| | D | S | F 314 | F 313 | F 312 | D | D | D | D | D | 304 |

FIG. 5

| TDD UL-DL configuration | Subframe n | 0 | 1 | 2 | 3 | 4 | 5 | 6 | 7 | 8 | 9 |
|---|---|---|---|---|---|---|---|---|---|---|---|
| 3 | PUSCH in subframe n+k corresponding to PDCCH in subframe n | 4 | | | | | | | | | 4 |
| 3 | PUCCH in subframe n+k corresponding to PDCCH in subframe n | 4 | 11 | | | | 7 | 6 | | 5 | 5 |

501

| TDD UL-DL configuration | Subframe n | 0 | 1 | 2 | 3 | 4 | 5 | 6 | 7 | 8 | 9 |
|---|---|---|---|---|---|---|---|---|---|---|---|
| 4 | PUSCH in subframe n+k corresponding to PDCCH in subframe n | | | | | 4 | | | | | |
| 4 | PUCCH in subframe n+k corresponding to PDCCH in subframe n | 12 | 11 | | 8 | 7 | 7 | 6 | | 5 | 4 |

502

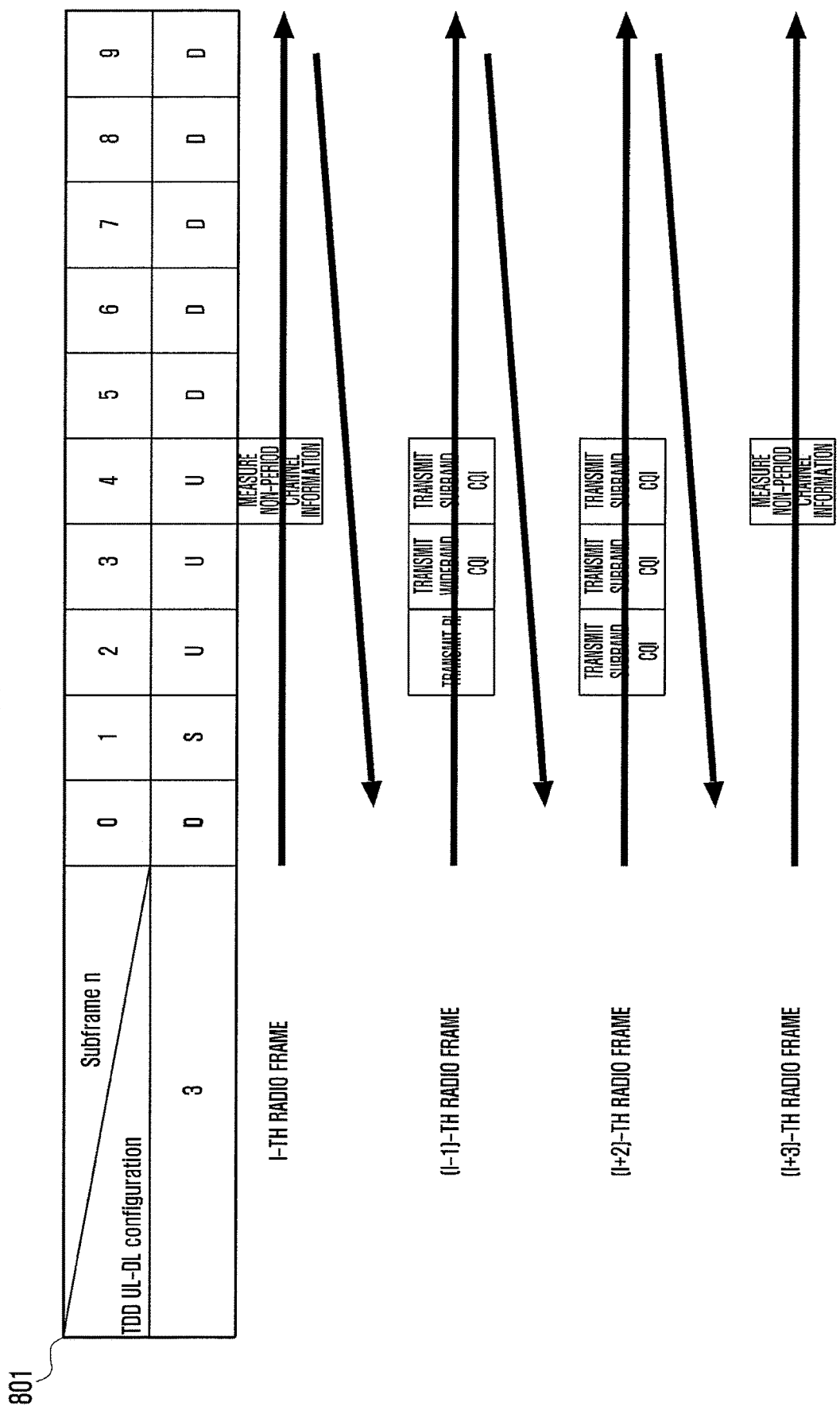

METHOD AND APPARATUS FOR OPERATING SUBFRAME AND TRANSMITTING CHANNEL INFORMATION FOR CONTROLLING INTERFERENCE IN COMMUNICATION SYSTEM

CROSS-REFERENCE TO RELATED APPLICATION(S)

This application is a continuation application of prior application Ser. No. 15/496,616, filed on Apr. 25, 2017, which has issued as U.S. Pat. No. 10,142,987 on Nov. 27, 2018, which is a continuation application of prior application Ser. No. 13/445,041, filed on Apr. 12, 2012, which has issued as U.S. Pat. No. 9,635,584 on Apr. 25, 2017, was based on and claimed priority under 35 U.S.C. § 119(a) of a Korean patent application number 10-2011-0033916, filed on Apr. 12, 2011, in the Korean Intellectual Property Office, the disclosure of which is incorporated by reference herein in its entirety.

BACKGROUND

1. Field

The present invention relates to a cellular wireless communication system. More particularly, the present invention relates to a method of controlling interference between different cells in a Time-Division Duplex (TDD) communication system for supporting a flexible subframe and a method of transmitting channel information by a terminal when an evolved Node B (eNodeB) schedules data through the flexible subframe.

2. Description of the Related Art

In recent years, an Orthogonal Frequency Division Multiple Access (OFDMA) scheme or a Single Carrier-Frequency Division Multiple Access (SC-FDMA) scheme similar thereto has been used as a scheme for transmitting high speed data through a wireless channel. The foregoing multiple access scheme allots and operates time-frequency resources that carry data or control information for each user in a non-overlapping manner, namely, to achieve orthogonality of the data or control information of each user.

An important consideration is support of a scalable bandwidth to provide high speed wireless data service in a cellular wireless communication system. As an example, a Long Term Evolution (LTE) system may have various bandwidths such as 20/15/10/5/3/1.4 MHz. Service providers may select one from among the foregoing bandwidths to provide service. There may be a plurality of types of terminals including a type supporting a maximum of up to 20 MHz of bandwidth and a minimum as small as 1.4 MHz of bandwidth. An LTE-Advanced (LTE-A) system, which is aimed at providing service that meets an International Mobile Telecommunications (IMT)-Advanced requirement, may provide a wideband service up to a maximum of 100 MHz of bandwidth by using LTE Carrier Aggregation (CA).

The LTE-A system uses a wider band than the LTE system for transmitting high speed data. Also, because backward compatibility with respect to LTE terminals is important, LTE terminals may access the LTE-A system to receive a service. To do this, the LTE-A system divides a total system band into sub-bands or Component Carriers (CCs) of a bandwidth capable of transmitting or receiving by an LTE terminal, combines a predetermined CC, and generates and transmits data for each CC to support high speed data transmission of the LTE-A system for each CC using a transmission/reception process of the LTE system. The CC may also be referred to as a cell. Each CC (or cell) is divided into a Primary Cell (PCell) and a Secondary Cell (SCell) in an application or importance in an aspect of a terminal. In an aspect of a terminal, the primary cell is one cell, and the secondary cell is any remaining cell except for the primary cell. In the LTE-A system, an uplink control channel may be transmitted in only the primary cell and an uplink data channel may be transmitted in the primary cell and the secondary cell.

Scheduling information with respect to data to be transmitted for each CC is reported to a terminal as Downlink Control Information (DCI). The DCI defines various formats to apply and operate a determined DCI format according to which it is scheduling information with respect to uplink data, scheduling information with respect to downlink data, a compact DCI, a DCI for power control, or spatial multiplexing using a multiple antenna. For example, a DCI format 1 being control information with respect to downlink data not applying a Multiple Input Multiple Output (MIMO) antenna is composed of control information as one or more as follows.

Resource allocation type 0/1 flag: notifies whether a resource allotment type is type 0 or type 1. Type 0 applies a bitmap type to allot a resource for each Resource Block Group (RBG). A fundamental unit of scheduling in LTE and LTE-A systems is a Resource Block (RB) expressed as time and frequency region resources. The RBG is configured by a plurality of RBs and becomes a fundamental unit of scheduling in type 0. Type 1 allots a certain RB in the RBG.

Resource block assignment: notifies of a RB allotted in data transmission. A resource expressed according to system bandwidth and resource allotment type is determined.

Modulation and coding scheme: notifies a modulation schemed and coding rate used in data transmission.

Hybrid Automatic Repeat Request (HARQ) process number: notifies a process number of HARQ.

New data indicator: notifies whether it is an HARQ initial transmission or a retransmission.

Redundancy version: notifies a redundancy version of an HARQ.

Transmission Power Control (TPC) command for Physical Uplink Control Channel (PUCCH): notifies a power control command with respect to a PUCCH being an uplink control channel.

The DCI is transmitted through a Physical Downlink Control Channel (PDCCH) being a downlink physical control channel via a channel coding and modulation procedure.

However, there is a problem in that interference between cells in the forgoing wireless communication system occurs. That is, a signal between an evolved Node B (eNodeB) and a terminal in each cell acts as mutual interference to a terminal of an adjacent cell. Due to this, the performance of the wireless communication system is deteriorated.

SUMMARY

Aspects of the present invention are to address at least the above-mentioned problems and/or disadvantages and to provide at least the advantages described below. Accordingly, an aspect of the present invention is to provide a method and an apparatus for operating a subframe and transmitting channel information for controlling interference in a communication system.

In accordance with an aspect of the present invention, a method of transmitting channel information by a terminal for controlling interference is provided. The method includes determining whether a subframe is a flexible subframe used for downlink transmission, measuring non-period channel information in the flexible subframe, when the subframe is the flexible subframe used for the downlink transmission, and transmitting data including the non-period channel information in the measured flexible subframe through at least one uplink subframe.

In accordance with another aspect of the present invention, a method of receiving channel information by an eNodeB for controlling interference is provided. The method includes determining whether a subframe is a flexible subframe used for downlink transmission, and receiving data including non-period channel information in the flexible subframe in at least one uplink subframe after the flexible subframe.

In accordance with another aspect of the present invention, a terminal for transmitting channel information for controlling interference is provided. The terminal includes a transceiver for transmitting and receiving information to and from an eNodeB, respectively, and a controller for determining whether a subframe is a flexible subframe used for downlink transmission based on information received from the eNodeB, for measuring non-period channel information in the flexible subframe, when the subframe is used for the downlink transmission, and for controlling to transmit data including the non-period channel information from the flexible subframe to the at least one uplink subframe.

In accordance with another aspect of the present invention, an eNodeB device for receiving channel information for controlling interference is provided. The eNodeB device includes a transceiver for transmitting and receiving information to and from an eNodeB, respectively, and a controller for controlling the transceiver to transmit information indicating whether a subframe is a flexible subframe used for downlink transmission to the terminal, and to receive data including non-period channel information in the flexible subframe in at least one uplink subframe after the flexible subframe.

In accordance with another aspect of the present invention, a method of operating a subframe of an eNodeB for controlling interference is provided The method includes determining an uplink protection subframe suppressing an uplink transmission, transmitting the determined uplink protection subframe to a neighboring eNodeB, and transmitting scheduling information for uplink data in a downlink subframe corresponding to the uplink protection subframe.

In accordance with another aspect of the present invention, a method of operating a subframe of an eNodeB for controlling interference is provided. The method includes receiving an uplink protection subframe suppressing uplink transmission by a neighboring eNodeB, determining a flexible subframe based on the uplink protection subframe, and using the flexible subframe for downlink transmission.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 3 is a diagram illustrating an example of a configuration of a sub-frame in a TDD frame according to an exemplary embodiment of the present invention;

FIG. 5 is a diagram illustrating an example for describing a relationship between sub-frames in a TDD frame according to an exemplary embodiment of the present invention;

FIGS. 8A and 8B are diagrams illustrating examples of a channel information transmitting procedure of a terminal according to the first exemplary embodiment of the present invention;

Throughout the drawings, it should be noted that like reference numbers are used to depict the same or similar elements, features, and structures.

DETAILED DESCRIPTION

Figure 1:
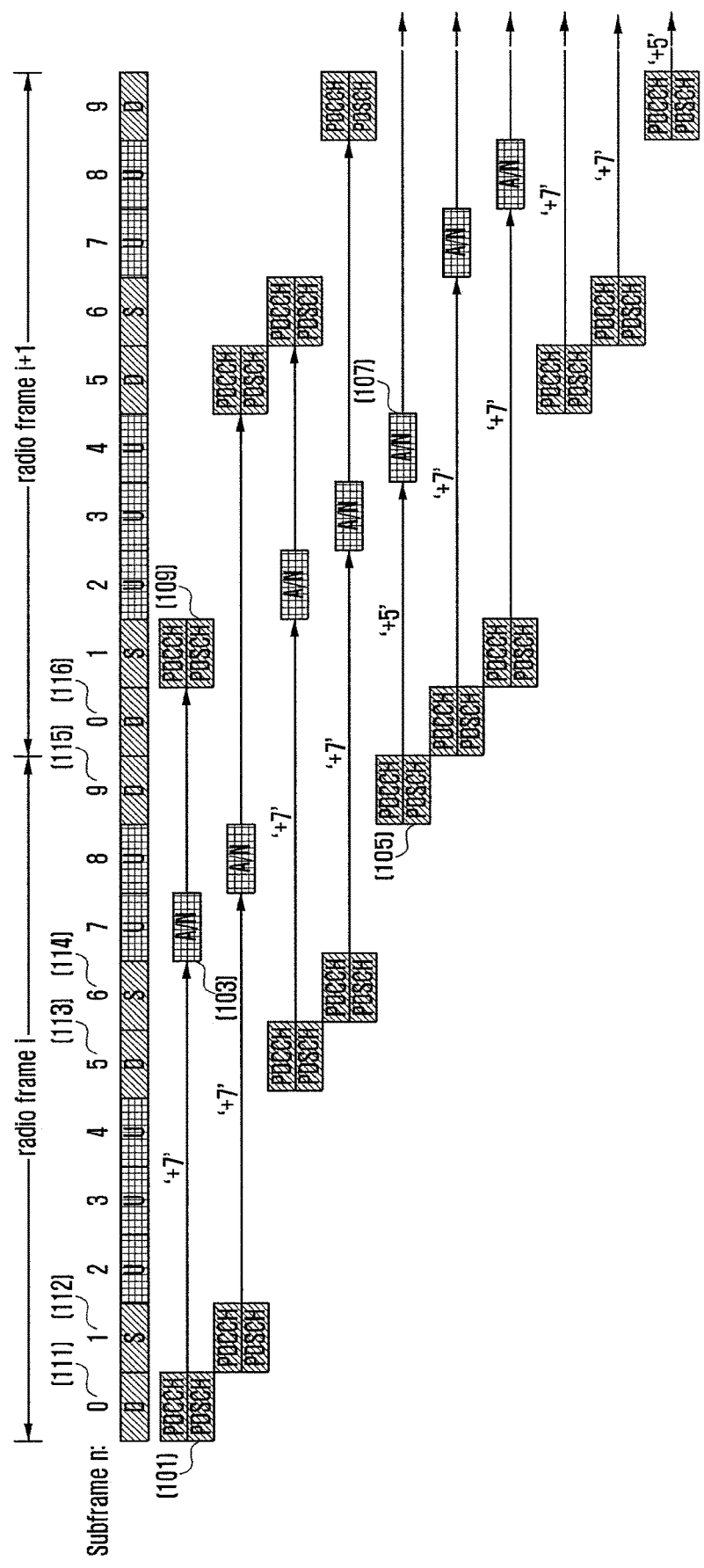
FIG. 1 is a diagram illustrating an example of an operation of a sub-frame in a Time-Division Duplex (TDD) frame according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

While exemplary embodiments of the present invention may be described in the context of a Time-Division Duplex (TDD) system for convenience in description, the present invention is equally applicable to other communication systems having a similar technical background and channel forms by applying variations and modifications falling within the spirit and scope of the present invention, as would be apparent to those skilled in the art.

A TDD communication system uses a common frequency in downlink and uplink, and distinctively operates transmission/reception of an uplink signal and a downlink signal in the time domain. The Long Term Evolution (LTE) TDD system distinctively transmits an uplink or downlink signal for each sub-frame. According to a traffic load of uplink and downlink, a subframe for uplink/downlink is equally divided and operated in the time domain, more subframes are allotted and operated in the downlink, or more subframes are allotted and operated in the uplink. In the LTE system, the length of the subframe is 1 ms, and ten subframes construct one radio frame.

TABLE 1

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

Table 1 illustrates a TDD Uplink-Downlink (TDD UL-DL) configuration. In Table 1, 'D' indicates a subframe set for downlink transmission, 'U' indicates a subframe set for uplink transmission, and 'S' indicates a Special subframe composed of a Downlink Pilot Time Slot (DwPTS), a Guard Period (GP), and a Uplink Pilot Time Slot (UpPTS). In DwPTS, control information may be transmitted through the downlink in the same manner as in a general subframe, and downlink data transmission is possible according to a set state of a special subframe when the length of the DwPTS is sufficiently long. The GP is a section for the switching of a transmission state from the downlink to uplink, and the length of the GP is determined according to a network setting or the like. The UpPTS is used to transmit a Sounding Reference Signal (SRS) used for estimating an uplink channel state or a Random Access Channel (RACH) for a terminal for random access.

For example, in a case of TDD UL-DL configuration #6, downlink data and control information may be transmitted to subframes #0, #5, #9, and downlink data and control information may be transmitted to subframes #2, #3, #4, #7, #8. Further, downlink control information and downlink data according to conditions may be transmitted in subframes #1 and #6 corresponding to a special subframe and SRS or RACH may be transmitted through uplink.

Because the transmission of a downlink or uplink signal is allowable during a certain time period in the TDD system, there is a need for defining a special timing relationship between uplink/downlink physical channels having correlation such as a control channel for data scheduling, a scheduled data channel, and a Hybrid Automatic Repeat Request (HARQ) ACKnowledgment (ACK)/Negative-ACKnowledgment (NACK) channel corresponding to a data channel.

The following is an uplink/downlink timing relation between a Physical Downlink Shared Channel (PDSCH) being a physical channel for transmitting downlink data and a Physical Uplink Control Channel (PUCCH) or a Physical Uplink Shared Channel (PUSCH) being a physical channel to which a corresponding uplink HARQ ACK/NACK is transmitted.

When receiving a PDSCH carried to a subframe n-k from the eNodeB, the terminal transmits uplink HARQ ACK/NACK with respect to the PDSCH to an uplink subframe n. In this case, k is a structural element of set K, and K is defined in Table 2.

TABLE 2

| UL-DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7,6 | 4 | — | — | — | 7,8 | 4 | — |
| 2 | — | — | 8,7,4,6 | — | — | — | — | 8,7,4,6 | — | — |
| 3 | — | — | 7,6,11 | 6,5 | 5,4 | — | — | — | — | — |
| 4 | — | — | 12,8,7,11 | 6,5,4,7 | — | — | — | — | — | — |
| 5 | — | — | 13,12,9,8,7,5,4,11,6 | — | — | — | — | — | — | — |
| 6 | — | — | 7 | 7 | 5 | — | — | 7 | 7 | — |

Table 3 rearranges to which subframe a corresponding uplink HARQ ACK/NACK is carried according to the definition of Table 2 when a PDSCH in a TDD UL-DL configuration is carried to each downlink subframe (D) or a special subframe (S)n.

TABLE 3

| UL-DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | D 4 | S 6 | U | U | U | D 4 | S 6 | U | U | U |
| 1 | D 7 | S 6 | U | U | D 4 | D 7 | S 6 | U | U | D 4 |
| 2 | D 7 | S 6 | U | D 4 | D 8 | D 7 | S 6 | U | D 4 | D 8 |
| 3 | D 4 | S 11 | U | U | U | D | D 7 | D 6 | D 6 | D 5 5 |
| 4 | D 12 | S 11 | U | U | D 8 | D 7 | D 7 | D 7 | F S | D 4 |
| 5 | D 12 | 1 11 | U | D 9 | D 8 | D 7 | D 6 | D 6 | D 4 | D 13 |
| 6 | D 7 | S 7 | U | U | U | D 7 | S 7 | U | U | D 5 |

FIG. 1 is a diagram illustrating an example of an operation of a sub-frame in a TDD frame according to an exemplary embodiment of the present invention. Table 3 will be described using FIG. 1. In this case, FIG. 1 is a diagram illustrating to which subframe a corresponding uplink HARQ ACK/NACK is carried according to the definition of Table 3 when a PDSCH in a TDD UL-DL configuration #6 of Table 3 is carried to each downlink or special subframe.

Referring to FIG. 1, a terminal transmits an uplink HARQ ACK/NACK corresponding to a PDSCH 101 which an evolved Node B (eNodeB) transmits to a subframe #0 of a radio frame i to a subframe #7 of a radio frame i (103). In this case, Downlink Control Information (DCI) including scheduling information with respect to the PDSCH 101 is transmitted to the same subframe as a subframe to which the PDSCH is transmitted through the PDCCH. As another example, the terminal transmits an uplink HARQ ACK/NACK corresponding to the PDSCH 105 which the eNodeB having carried to a subframe #9 of a radio frame i to a subframe #4 of a radio frame i+1 (107). In the same manner, downlink control information DCI including scheduling information with respect to the PDSCH 105 is transmitted to the same subframe as the subframe to which the PDSCH is transmitted through the PDCCH.

In the LTE system, downlink HARQ uses an asynchronous HARQ scheme in which a data retransmission time point is not fixed. That is, when receiving feedback of HARQ NACK with respect to HARQ initial transmission data transmitted by the eNodeB from a terminal, the eNodeB freely determines a transmission time point of retransmission data of a next HARQ by a scheduling operation. As a decoding result with respect to received data for an HARQ operation, after buffering HARQ data determined as including an error, it is combined with next HARQ retransmission data. In this case, so as to maintain a received buffer capacity of the terminal within a predetermined limit, the maximum number of downlink HARQ processed for each TDD UL-DL configuration is defined as illustrated in a following Table 4. One HARQ process is mapped to one subframe in the time domain.

TABLE 4

| TDD UL/DL configuration | Maximum number of HARQ processes |
|---|---|
| 0 | 4 |
| 1 | 7 |
| 2 | 10 |
| 3 | 9 |
| 4 | 12 |
| 5 | 15 |
| 6 | 6 |

Referring to FIG. 1, the terminal decodes a PDSCH (101) in a subframe #0 of a radio frame i to which an eNodeB transmits. If it is determined that the decoded PDSCH includes an error, the terminal transmits a HARQ NACK to a subframe #7 of a radio frame I (103). When receiving the HARQ NACK, the eNodeB configures retransmission data with respect to the PDSCH (101) by a PDSCH (109) and transmits it together with the PDCCH. The example of FIG. 1 illustrates that the retransmission data are carried to a subframe #1 of a radio frame i+1 by reflecting that a maximum number of downlink HARQ processes of TDD UL-DL configuration #6 according to definition of Table 4. That is, there are a total of 6 downlink HARQ processes (111, 112, 113, 114, 115, and 116) between an initial transmission PDSCH 101 and a retransmission PDSCH 109.

In the LTE system, the uplink HARQ uses a synchronous HARQ scheme in which a data transmission time point is fixed unlike a downlink HARQ. That is, an uplink/downlink timing relation of a Physical Uplink Shared Channel (PUSCH) being a physical channel for transmitting uplink data, a PDCCH being a preceding downlink control channel thereof, and a Physical Hybrid Indicator Channel (PHICH) being a physical channel to which a downlink HARQ ACK/NACK corresponding to the PUSCH is transmitted is fixed by a rule described below.

When receiving a PDCCH including uplink scheduling control information provided from an eNodeB or a PHICH to which a downlink HARQ ACK/NACK is transmitted, the terminal transmits uplink data corresponding to the control information to a subframe n+k through a PUSCH. In this case, k is defined in Table 5 as follows.

TABLE 5

| TDD UL/DL configuration | DL subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

Further, when the terminal receives a PHICH carrying a downlink HARQ ACK/NACK from an eNodeB in a subframe, the PHICH corresponds to a PUSCH which the terminal transmits to a subframe i-k. In this case, k is as defined in Table 6 as follows.

TABLE 6

| TDD UL/DL configuration | DL subframe number n | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | | 6 | | | | | 6 | |
| 3 | 6 | | | | | | | | 6 | 6 |
| 4 | | | | | | | | | 6 | 6 |
| 5 | | | | | | | | | 6 | |
| 6 | 6 | 4 | | | | | 7 | 4 | | 6 |

Figure 2:
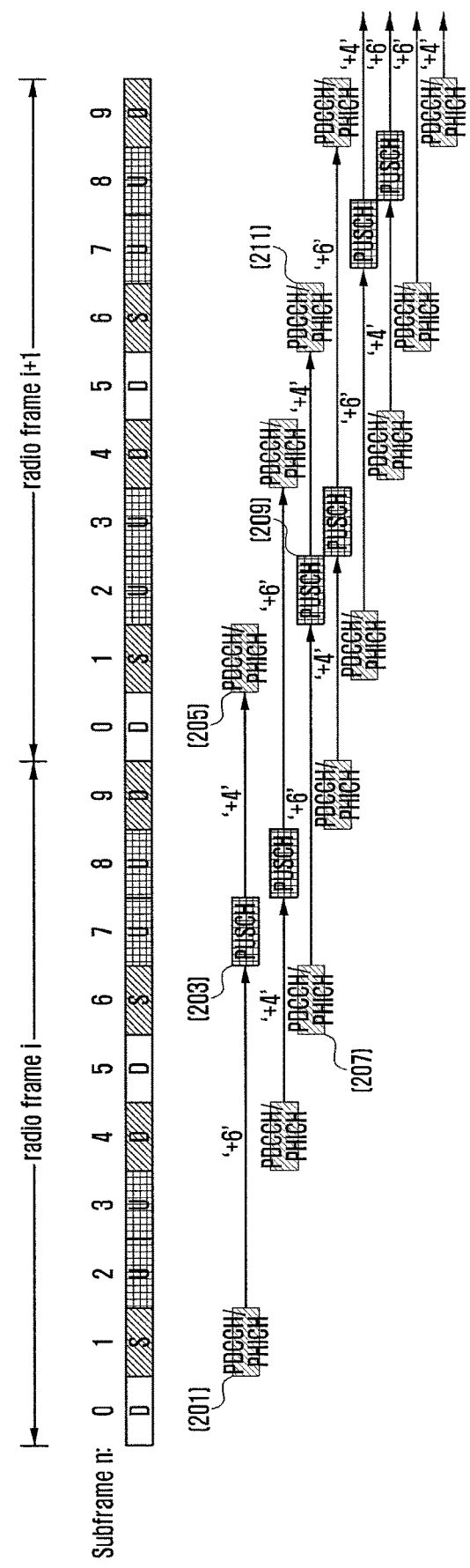
FIG. 2 is a diagram illustrating another example of an operation of a subframe in a TDD frame according to an exemplary embodiment of the present invention.

FIG. 2 is a diagram illustrating another example of an operation of a sub-frame in a TDD frame according to an exemplary embodiment of the present invention. In this case, FIG. 2 is a diagram illustrating to which subframe an uplink PUSCH corresponding to a PDCCH or a PHICH when the PDCCH or the PHICH is carried to each downlink or special subframe, and to which subframe a PHICH corresponding to the PUSCH is carried according to definitions of Table 5 and Table 6 in a case of TDD UL-DL configuration #1.

Referring to FIG. 2, the terminal transmits a PDCCH provided from an eNodeB through a subframe #1 of a radio frame i or an uplink PUSCH corresponding to a PHICH (201) through a subframe #7 of a radio frame i (203). Further, the eNodeB transmits a PHICH corresponding to the PUSCH to the terminal through a subframe #1 of a radio frame i+1 (205). As another example, the terminal transmits a PDCCH provided from the eNodeB through a subframe #6 of a radio frame i or an uplink PUSCH corresponding to the PHICH (207) through a subframe #2 of a radio frame i+1 (209). Moreover, the eNodeB transmits a PHICH corresponding to the PUSCH to the terminal through a subframe #6 of a radio frame i+1 (211).

The LTE TDD system restricts downlink transmission of a PDCCH or a PHICH corresponding to the PUSCH associated with transmission of a PUSCH in a certain downlink subframe to secure minimum transmission/reception processing times of an eNodeB and a terminal. For example, in a case of TDD UL-DL configuration #1, a PDCCH for scheduling the PUSCH or a PHICH corresponding to the PUSCH are not transmitted in the downlink through subframes #0 and #5.

In general, because the number of subframes for transmitting uplink and the number of subframes for transmitting downlink are determined after TDD UL-DL configuration is determined, it may not be possible to actively process a case where a certain eNodeB requires data having more downlink transmission than uplink transmission in a certain eNodeB at a certain time point. A flexible subframe approach capable of dynamically changing a TDD UL-DL configuration of an entire system instead of changing the TDD UL-DL according to a data request capacity of the uplink/downlink in a certain eNodeB has been suggested. The flexible subframe may be allotted from an uplink subframe existing in front of downlink subframe to an uplink subframe continuously adjacent on the time axis so as not to influence a protection time which should be between a downlink subframe and the uplink subframe.

FIG. 3 is a diagram illustrating an example of a configuration of a sub-frame in a TDD frame according to an exemplary embodiment of the present invention. In this case, FIG. 3 is a diagram illustrating an example of applying a flexible subframe to TDD UL-DL configuration #3.

Referring to FIG. 3, when the flexible subframe is not operated, a frame may be configured as 301. Further, when one flexible subframe is operated, the frame may be configured as 302. In this case, one uplink subframe neighboring a downlink subframe among the uplink subframes is operated as a flexible subframe as illustrated in 309. In other words, a subframe #4 may be operated as a flexible subframe. Further, when a plurality of flexible subframes is operated, the frame may be configured as 303 and 304. In this case, at least two adjacent uplink subframes neighboring a downlink subframe are operated as flexible subframes as illustrated in 310 and 311 in 303 and (312, 313, and 314 in 304). Here, the flexible subframes continuously appear between downlink subframes. That is, when the subframe #3 is used for downlink transmission as a flexible subframe, the subframe #4 should always be used for downlink transmission together with the subframe #3 as the flexible frame after the subframe #3. In the same manner, when the subframe #2 is used for downlink transmission as the flexible subframe, the uplink subframe #3 and the uplink subframe #4 should be used for downlink transmission together with the subframe #2 as a flexible frame. In this case, according to the implementation, the eNodeB may notify the uplink subframe operating as a flexible subframe to the terminal using separate information or signaling. Further, the terminal may discriminate an uplink subframe operated as the flexible subframe itself without separate information or signaling. Further, when there are p flexible subframes corresponding to an integer including a special subframe and a downlink subframe firstly appearing after the special subframe, for example, a subframe #n between a subframe #n+1, the flexible subframes are subframes from a subframe #n−p+1 to a subframe #n, which are subframes neighboring each other on a time axis. Further, when the frame includes at least two uplink subframes to be spaced apart from each other on the time axis, a part of the uplink subframes may be operated as a flexible subframe.

Figure 4:
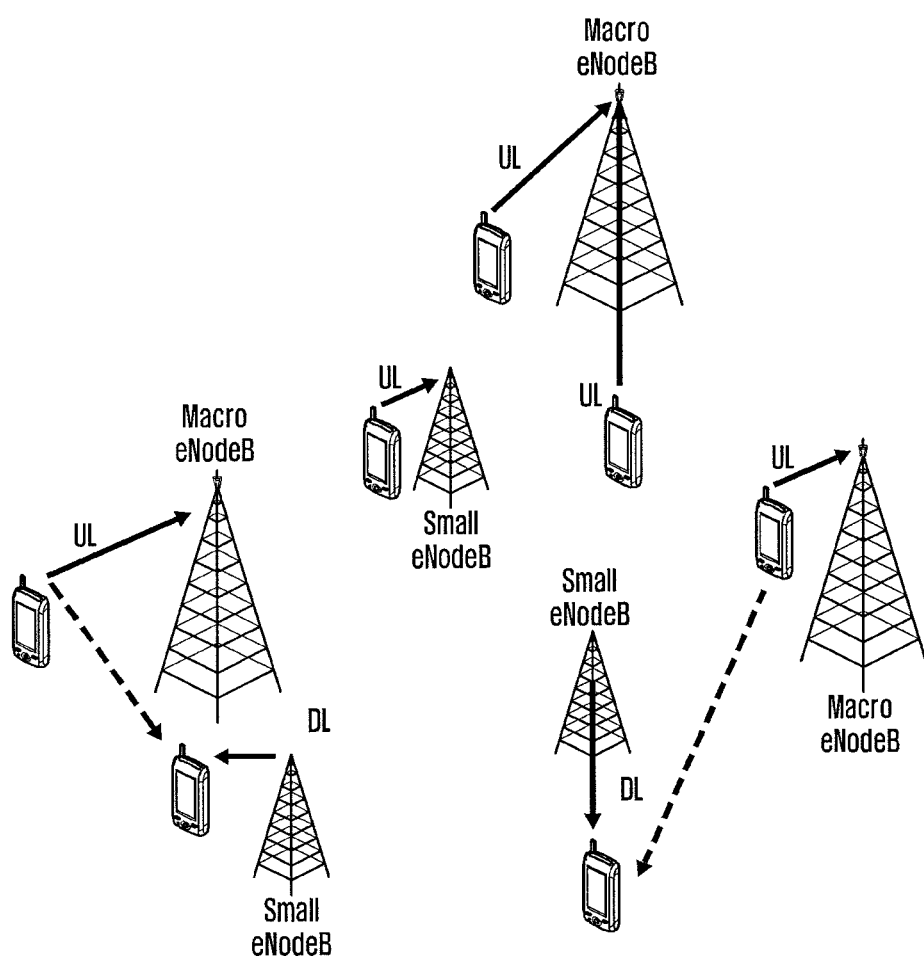
FIG. 4 is a conceptual diagram illustrating a communication system for operating a TDD frame according to an exemplary embodiment of the present invention.

FIG. 4 is a conceptual diagram illustrating a communication system for operating a TDD frame according to an exemplary embodiment of the present invention. In this case, FIG. 4 is a diagram illustrating a certain eNodeB using a flexible subframe for downlink transmission when there is a plurality of eNodeBs and the eNodeBs are operated with the same TDD UL-DL configuration.

Referring to FIG. 4, when a macro eNodeB originally uses a corresponding flexible subframe for uplink transmission, and a small eNodeB located nearby uses a corresponding flexible subframe for downlink transmission, a small eNodeB terminal having received downlink transmission from a small eNodeB is interfered by a nearby macro eNodeB terminal transmitting an uplink to a macro eNodeB. The interference is shown in FIG. 4 as a dotted arrow. Accordingly, when the small eNodeB uses the flexible subframe for downlink transmission, there is a need for an approach for receiving the downlink without the small eNodeB terminal receiving interference. The corresponding approach should not influence use of a resource of the macro eNodeB.

Further, when the small eNodeB uses a flexible subframe for downlink transmission, the small eNodeB needs channel information capable of being referred when scheduling downlink data. However, there is a need for notifying channel information to a small eNodeB by a small eNodeB terminal in a state where an interference situation entirely differs from a previous situation prior to a flexible subframe, in a state where there is interference due to downlink transmission of an adjacent macro eNodeB, interference due to operating a flexible subframe to transmit uplink or downlink by a neighboring small eNodeB.

Here, in the present exemplary embodiment, when a small eNodeB uses a flexible subframe for downlink transmission in a TDD system, a small eNodeB terminal controls interference caused from the macro eNodeB terminal so as not to influence resource use of the macro eNodeB.

A method is now described in which the small eNodeB transmits downlink channel information capable of being referred upon scheduling downlink data by a small eNodeB when the small eNodeB uses the flexible subframe for downlink transmission in the TDD system.

First, the method is described in which a small eNodeB terminal controls interference received from a macro eNodeB terminal, which does not influence use of a resource of the macro eNodeB when a small eNodeB uses a flexible subframe for downlink transmission in the TDD wireless communication system.

FIG. 5 is a diagram illustrating an example for describing a relationship between sub-frames in a TDD frame according to an exemplary embodiment of the present invention. In this case, FIG. 5 is a diagram comparing PUSCH transmission timing with PUCCH transmission timing according to a PDCCH through TDD UL-DL configuration #3. The PUSCH transmission timing according to the PDCCH is shown in Table 5 and the PUCCH timing according to a PDCCH is shown in Table 3.

Referring to FIG. 5, reference numeral 501 illustrates a timing relationship with respect to TDD UL-DL configuration #3 in Table 3 and Table 5. Reference numeral 502 illustrates a timing relationship with respect to TDD UL-DL configuration #4 in Table 3 and Table 5.

It can be appreciated that a PUSCH is generated in a subframe #4 according to control information for a PUSCH of a PDCCH in a subframe #0 and a PUCCH is generated in a subframe #4 according to control information for a PUCCH of a PDCCH in a subframe #0. Further, it can be appreciated that a PUCCH is generated in a subframe #4 according to control information for a PUCCH of a PDCCH in a subframe #9. Accordingly, when the subframe #4 is set as a flexible subframe, the macro eNodeB of FIG. 4 may set subframes #0 and #9 as a Blanking subframe without PDCCH transmission such that uplink interference is not interfered in the subframe #4. The small eNodeB of FIG. 4 sets a subframe #4 as a flexible subframe based on information with respect to the Blanking subframe, and uses the flexible subframe, and a terminal of a small eNodeB may receive downlink transmission without interference. However, when a macro eNodeB does not transmit a PDCCH through a subframe #9, because a PUSCH is generated from the subframe #3 according to control information for a PUSCH of a PDCCH in the subframe #9, it can be appreciated that the PUSCH in the subframe #3 not influencing an operation of a flexible subframe of the small eNodeB is prevented to cause resource consumption of the macro eNodeB.

Accordingly, the present exemplary embodiment suggests that uplink protection subframe information being information limiting PUCCH transmission of a macro eNodeB is transmitted to neighboring eNodeBs instead of notifying blanking information with subframes #0 and #9 as illustrated in reference numeral 501. In the present exemplary embodiment, the macro eNodeB may not transmit control information for a PUCCH through a PDCCH in a subframe #0 to restrict PUCCH transmission through a subframe #4. Moreover, in the present exemplary embodiment, a macro eNodeB may transmit control information for a PUSCH through a PDCCSH in a downlink subframe #9 to restrict a PUCCH through the subframe #4. That is, the macro eNodeB may transmit a PUSCH in a subframe #3 through control information for a PUSCH of a PDCCH in a subframe #9. A neighboring small eNodeB having received the uplink protection subframe information may set the subframe #4 as a flexible subframe and perform downlink transmission through the flexible subframe, and a terminal of a small eNodeB may receive the downlink transmission without interference.

In substantially the same manner, as illustrated in reference numeral 502, it can be appreciated that a PUSCH is generated from a subframe #3 according to control information for a PUSCH of a PDCCH in the subframe #9, and a PUCCH is generated from the subframe #3 according to control information for a PUCCH of a PDCCH in the subframe #9. Further, it can be appreciated that a PUCCH is generated from a subframe #3 according to control information for a PUCCH of a PDCCH in a subframe #8. Accordingly, when the subframe #3 is set as a flexible subframe, the macro eNodeB of FIG. 4 may set subframes #9 and #8 as a blanking subframe not carrying the PDCCH not to prevent the occurrence of uplink interference in the subframe #3, and transmit the information to a neighboring eNodeB. A small eNodeB sets the subframe #3 as the flexible subframe based on the information with respect to the blanking subframe, and performs downlink transmission in the flexible subframe such that a terminal of the small eNodeB may receive the downlink transmission without interference. However, when a PDCCH is not transmitted through a subframe #8 of a macro eNodeB, because a PUSCH is generated from the subframe #2 according to control information for a PUSCH of a PDCCH through the subframe #8, it can be appreciated that resource consumption occurs by preventing PUSCH transmission through a subframe #2 not influencing an operation of a flexible subframe of the small eNodeB. Accordingly, as illustrated previously, the present exemplary embodiment suggests an approach of transmitting uplink protection subframe information being information restricting PUCCH transmission of a macro eNodeB in the subframe #3 instead of notifying blanking information with respect to subframes #8 and #9. Through this approach, the macro eNodeB may not transmit control information for a PUCCH through a PDCCH in the subframe #9 to restrict PUCCH transmission through the subframe #3. Furthermore, in the present exemplary embodiment, the macro eNodeB may transmit control information for a PUSCH through a PDCCH in a downlink subframe #8 to restrict PUCCH transmission through the subframe #3. That is, the macro eNodeB may perform PUSCH transmission in the subframe #2 through control information for a PUSCH of a PDCCH through the subframe #8. A neighboring small eNodeB having received the uplink protection subframe information may set the subframe #3 as a flexible subframe and perform downlink transmission through the flexible frame, and a terminal of a small eNodeB may receive the downlink transmission without interference.

Figure 6A:
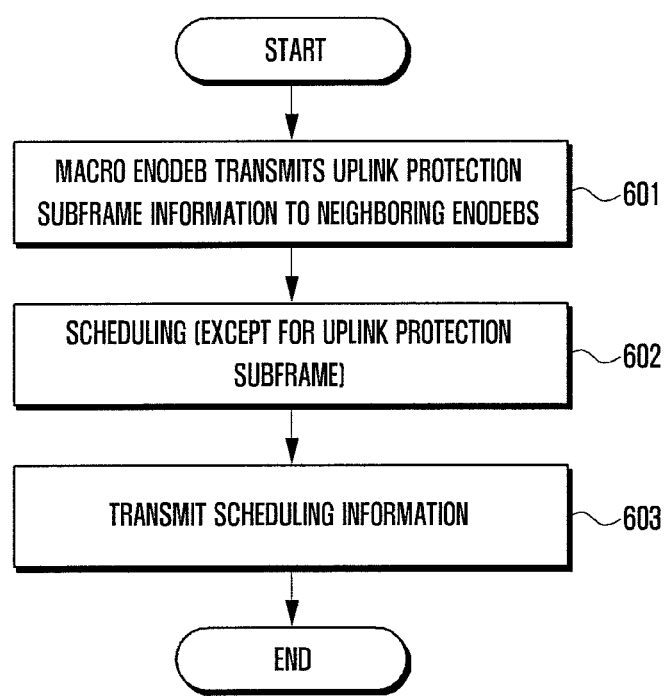
FIGS. 6A and 6B are flowcharts illustrating a method of operating an evolved Node B (eNodeB) in a communication system according to an exemplary embodiment of the present invention.

FIG. 6A is a flowchart illustrating a method of operating an eNodeB in a communication system according to an exemplary embodiment of the present invention.

Referring to FIG. 6A, a macro eNodeB transmits uplink protection subframe information to neighboring eNodeBs in step 601. In this case, the macro eNodeB determines and notifies an uplink protection subframe for suppressing uplink transmission in a terminal of a macro eNodeB to neighboring eNodeBs. Here, the neighboring eNodeB may be another macro eNodeB and a small eNodeB. To do this, the macro eNodeB may transmit presence of determination of an uplink protection subframe with respect to each subframe through a bitmap corresponding to entire subframes. Meanwhile, the macro eNodeB may transmit presence of determination of an uplink protection subframe with respect to each uplink subframe through a bitmap corresponding to uplink subframes in a corresponding TDD UL-DL configuration. In the meantime, the macro eNodeB may transmit an indicator indicating a frame configuration including an uplink protection subframe implemented in a corresponding TDD UL-DL configuration, for example, one frame configuration of reference numerals 301, 302, 303, or 304. Here, when a subframe is operated according to a TDD UL-DL configuration #3, the macro eNodeB may determine at least one of subframe #2, #3, or #4 as an uplink protection subframe. The macro eNodeB performs scheduling in step 602. In this case, the macro eNodeB may not perform scheduling with respect to the uplink protection subframe such that uplink transmission is not achieved from a terminal of the macro eNodeB through the uplink protection subframe. The macro eNodeB transmits scheduling information according to a scheduling result in step 603. In this case, the macro eNodeB transmits scheduling information of a PUSCH in a downlink subframe corresponding to an uplink protection subframe. Here, when a subframe is operated according to a TDD UL-DL configuration #3, the macro eNodeB does not transmit scheduling information of a PUCCH in a subframe #9 but transmits scheduling information of a PUSCH.

Meanwhile, although not shown, if an uplink protection subframe determined by a neighboring eNodeB is notified, the macro eNodeB may set a corresponding uplink protection subframe. Further, the eNodeB performs scheduling. In this case, the macro eNodeB does not perform scheduling with respect to the uplink protection subframe such that uplink transmission is not achieved through the uplink protection subframe. Next, the macro eNodeB transmits scheduling information according to a scheduling result. In this case, the macro eNodeB transmits scheduling information for a PUSCH through a downlink subframe corresponding to an uplink protection subframe. Here, when the subframe is operated according to a TDD UL-DL configuration #3, the macro eNodeB does not transmit scheduling information for a PUCCH in a subframe #9 but transmits scheduling information for a PUSCH.

Figure 6B:
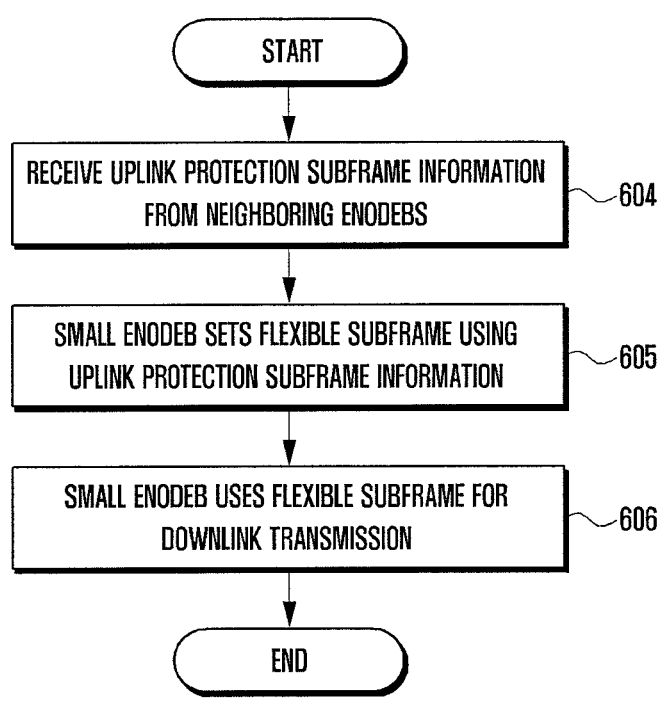

FIG. 6B is a flowchart illustrating a method of operating a subframe of a small eNodeB in a communication system according to an exemplary embodiment of the present invention.

Referring to FIG. 6B, a small eNodeB receives uplink protection subframe information from neighboring eNodeBs in step 604. The small eNodeB sets a flexible subframe using the uplink protection subframe information in step 605. The small eNodeB uses the flexible subframe for downlink transmission in step 606.

Through this, a terminal of a macro eNodeB does not perform uplink transmission through an uplink protection subframe. Further, the terminal of the small eNodeB performs downlink transmission using an uplink protection subframe of a macro eNodeB as a flexible subframe. Accordingly, interference of the terminal of the small eNodeB is suppressed from a terminal of the macro eNodeB. That is, the terminal of the small eNodeB may receive downlink transmission without interference.

Next, a method is described in which the small eNodeB terminal transmits downlink channel information capable of being referred upon scheduling downlink data by a small eNodeB when the small eNodeB uses the flexible subframe for downlink transmission in the TDD system. Prior to describing the method, it may be assumed that there is no uplink transmission in a neighboring macro eNodeB or a small eNodeB using a method suggested in FIG. 5, FIG. 6A, and FIG. 6B when the small eNodeB uses a flexible subframe for downlink transmission. Accordingly, when there is neighboring small eNodeBs using the flexible subframe for downlink transmission, an approach capable of knowing channel information including downlink interference from corresponding small eNodeBs is provided.

Figure 7A:
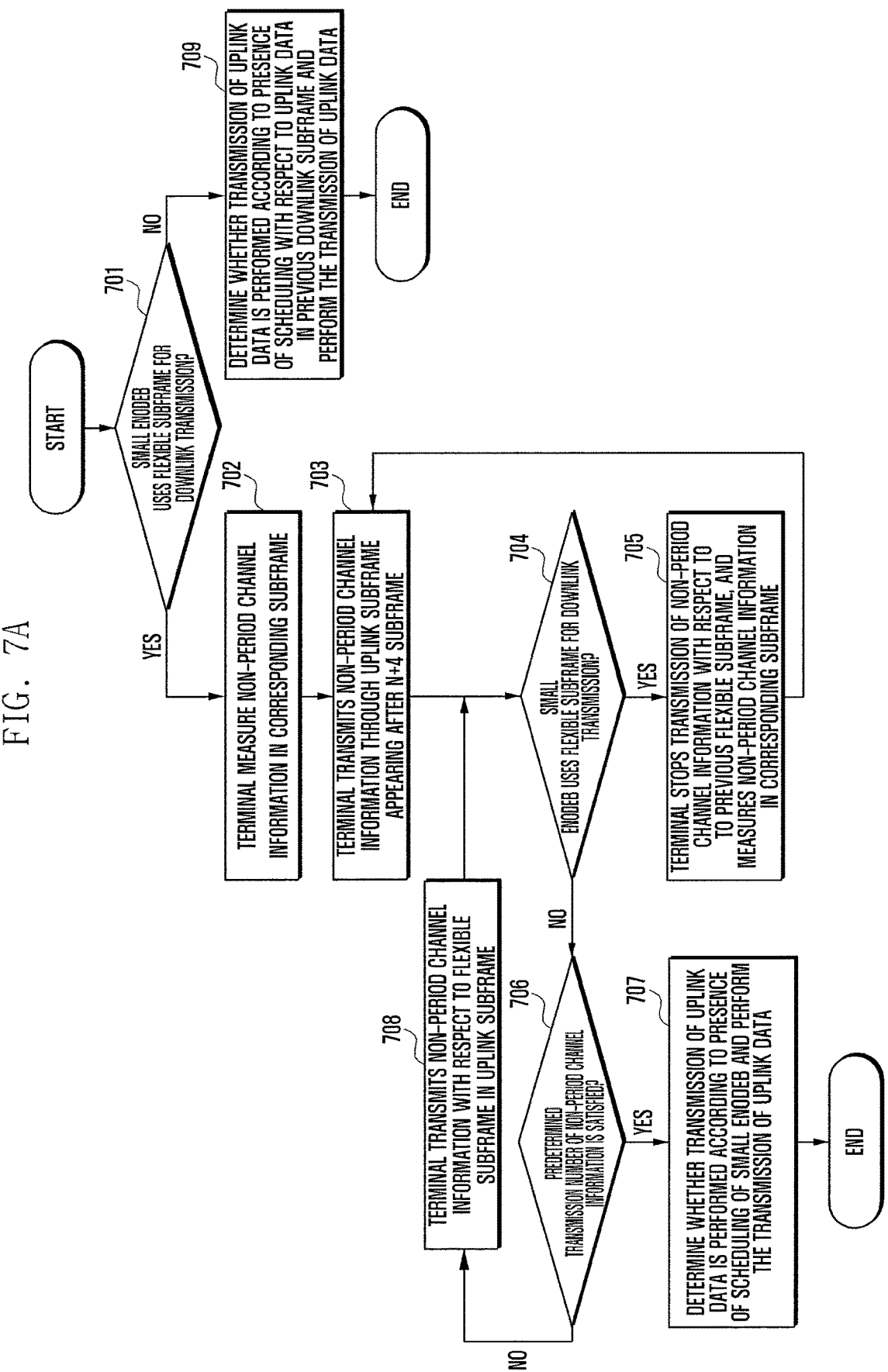
FIGS. 7A, 7B, 7C, and 7D are flowcharts illustrating channel information transmitting methods by a terminal in a communication system according to first, second, third, and fourth exemplary embodiments of the present invention, respectively.

FIG. 7A is a flowchart illustrating channel information transmitting methods by a terminal of a small eNodeB in a communication system according to the first exemplary embodiment of the present invention.

Referring to FIG. 7A, a terminal determines whether a small eNodeB uses a flexible subframe for downlink transmission in step 701. The corresponding determination decodes a PDCCH in a region which the PDCCH of the flexible subframe may exist to determine whether there is a DL DCI format transmitted to the terminal. If there is no DL DCI format, the terminal determines whether transmission of uplink data is performed according to presence of scheduling with respect to uplink data in a previous downlink subframe and performs the transmission of uplink data in step 709. If there is the DL DCI format, the terminal may know that the flexible subframe is used for downlink transmission and measures non-period channel information in a corresponding subframe in step 702. The terminal transmits the non-period channel information through an uplink subframe appearing after an n+4 subframe in step 703. That is, the terminal may measure the non-period channel information through the flexible frame without a separate request from a small eNodeB.

If the subframe #4 is set as a flexible subframe in reference numeral 501 and a small eNodeB uses the flexible subframe for downlink transmission, the terminal transmits the non-period channel information through a subframe #2 of a next radio frame. Concrete contents of the non-period channel information may be previously set according to a transmission mode set in the terminal, and may be transmitted through upper layer signaling. For example, the contents of the non-period channel information may be a periodic band, namely, channel quality indicator (CQI)/Precoding Matrix Indicator (PMI), or a periodic sub-band CQI/PMI. In a case of the periodic sub-band CQI/PMI, the number and the size of sub-bands may be previously determined and may be transmitted through upper layer signaling. Further, a Rank Indicator (RI) may be transmitted. As described above, the terminal may selectively transmit non-period channel information and periodic channel information to the eNodeB according to whether a flexible subframe is used for downlink transmission. To selectively transmit the channel information, the terminal may store the periodic channel information and the non-period channel information. A transmission order and the transmission number of channel information such as the wideband CQI/PMI, the sub-band CQI/PMI, and RI may be previously determined according to an importance of the channel information or the number of uplink subframes according to a TDD UL-DL configuration, and may be transmitted through upper layer signaling. If there is another upper layer control signal to be transmitted at step 703 or upper layer data, they may be simultaneously multiplexed and transmitted. A part of the upper layer control information or upper layer data may not be transmitted through a predetermined method or upper layer signaling.

Subsequently, the terminal determines whether a small eNodeB uses a flexible subframe for downlink transmission through an operation of step 704 in a flexible subframe appearing afterward. When the flexible subframe is used for downlink transmission, the terminal stops transmission of non-period channel information with respect to a previous flexible subframe, and measures the non-period channel information in a corresponding subframe in step 705. Next, the process returns to step 703 and performs a corresponding operation.

If the flexible subframe is not used for downlink transmission at step 704, the terminal determines whether the predetermined transmission number of non-period channel information is satisfied in step 706. If the predetermined transmission number of non-period channel information is satisfied, the terminal determines whether transmission of uplink data is performed according to the presence of scheduling of a small eNodeB and performs the transmission of uplink data in step 707. If the predetermined transmission number of non-period channel information is not satisfied at step 706, the terminal transmits non-period channel information with respect to a flexible subframe in uplink subframe in step 708. In this case, transmitted non-period channel information to be transmitted is determined according a predetermined transmission order of channel information. If there is another upper layer control information or upper layer data to be transmitted at step 708, they may be multiplexed and transmitted. The process then returns to step 704 and performs a corresponding operation.

Figure 8B:
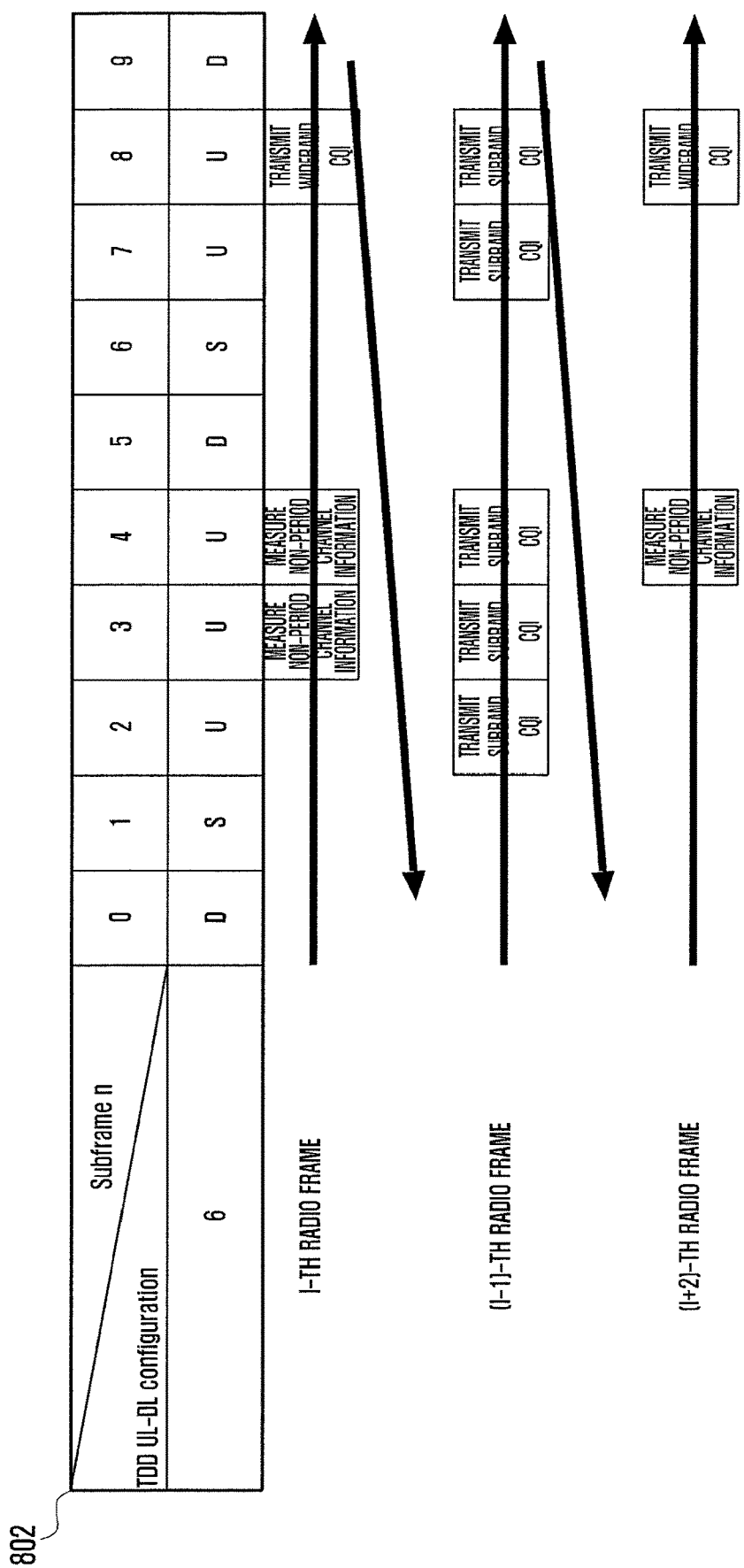

FIGS. 8A and 8B are diagrams illustrating examples of a channel information transmitting procedure of a terminal according to the first exemplary embodiment of the present invention.

Referring to FIG. 8A, reference numeral 801 illustrates detailed non-period channel information and a time point when a subframe #4 in TDD UL-DL configuration #3 is set as a flexible subframe, and downlink transmission is performed. The small eNodeB performs downlink transmission through a subframe #4 of an i-th radio frame, and the terminal detects a DCI format as illustrated at step 701 of FIG. 7A, recognizes that the subframe is performed for downlink transmission, and measures non-period channel information in the subframe. Next, the terminal transmits the non-period channel information measured in a subframe #2 of an (i+1)-th radio frame first appearing after an (n+4)-th frame. It is assumed in this exemplary embodiment that RI, wideband CQI, and sub-band CQI are set to be transmitted according to upper layer signaling. It is assumed that the transmission numbers of RI, wideband CQI, or sub-band CQI are set to 1, 1, and 4, respectively. It is assumed that the transmission order is previously set in an order of RI, wideband CQI, a sub-band CQI, a sub-band CQI, a sub-band CQI, and a sub-band CQI. The size of the sub-band may be previously set according to a downlink bandwidth size, and the downlink bandwidth may be set to be divided into a set of plural sub-bands. Further, selection of the sub-bands may be set such that a terminal may select and inform one from the set of sub-bands to the eNodeB. An RI is firstly transmitted in a sub-frame #2 of an (i+1)-th radio frame. A wideband CQI is transmitted in a subframe #3 of an (i+1)-th radio frame. Next, a sub-band CQI is transmitted in a subframe #4 of the (i+1)-th radio frame. Next, the sub-band CQI is transmitted from a subframe #3 to a subframe #4 of an (i+2)-th radio frame, respectively. The subframe #4 of an (i+3)-th radio frame is used for downlink transmission of the subframe by the small eNodeB, and the terminal measures non-period channel information and transmits channel information as set above.

Referring to FIG. 8B, reference numeral 802 illustrates detailed non-period channel information and a time point when subframes #3 and #4 are set as a flexible subframe from a TDD UL-DL configuration #6, and downlink transmission is performed. The small eNodeB performs downlink transmission through subframes #3 and #4 of an i-th radio frame, and the terminal measures non-period channel information in the subframes #3 and #4. Subsequently, transmission of non-period channel information measured from a subframe #8 of an i-th radio frame first appearing after an (n+4) frame. It is assumed in this exemplary embodiment that wideband CQI and sub-band CQI are set to be transmitted according to upper layer signaling. It is assumed that the transmission numbers of a wideband CQI for a subframe #3, a sub-band CQI, a wideband CQI for a subframe #4, and a sub-band CQI are set to 1, 2, 1, and 2, respectively. It is assumed that the transmission order is previously set in an order of the wideband CQI for the subframe #3, a sub-band CQI, the sub-band CQI, a wideband CQI for the subframe 4#, the sub-band CQI, and the sub-band CQI. The size of the sub-band may be previously set according to a downlink bandwidth size, and the downlink bandwidth may be set to be divided into a set of plural sub-bands. Further, selection of the sub-bands may be set such that a terminal may select and inform one from the set of sub-bands to the eNodeB. A wideband CQI for the subframe #3 is firstly transmitted in a sub-frame #8 of an i-th radio frame. A wideband CQI for the subframe #3 is transmitted in a sub-frame #2 of an (i+1)-th radio frame. Next, a wideband CQI for the subframe #3 is transmitted in a sub-frame #3 of an (i+1)-th radio frame. Next, a wideband CQI for the subframe #4 is transmitted in a sub-frame #4 of an (i+1)-th radio frame. Next, a wideband CQI for the subframe #4 is transmitted in a sub-frame #7 and a sub-frame #8 of an (i+1)-th radio frame, respectively. The subframe #4 of an (i+2)-th radio frame is used for downlink transmission of the subframe by the small eNodeB, and the terminal measures non-period channel information and transmits channel information with respect to the subframe #4 as set above.

Figure 7B:
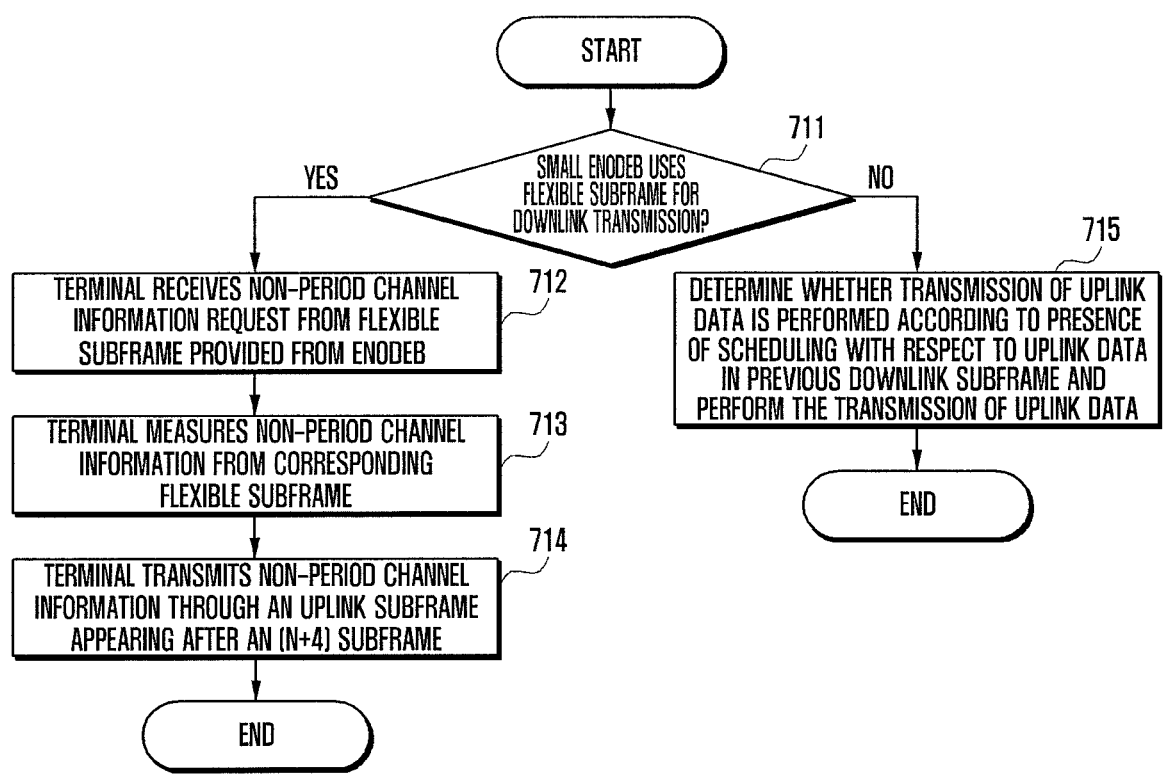

FIG. 7B is a flowchart illustrating a method of transmitting channel information by a terminal of a small eNodeB in a communication system according to a second exemplary embodiment of the present invention. Unlike the first exemplary embodiment of FIG. 7A and FIGS. 8A and 8B, a second exemplary embodiment of FIG. 7B may transmit channel information through a PUSCH.

Referring to FIG. 7B, the terminal determines whether a small eNodeB uses a flexible subframe for downlink transmission in step 711. The corresponding determination includes decoding a PDCCH in a region which the PDCCH of the flexible subframe may exist to determine whether there is a DL DCI format transmitted to the terminal. If there is no DL DCI format, the terminal determines whether transmission of uplink data is performed according to presence of scheduling with respect to uplink data in a previous downlink subframe and performs the transmission of uplink data in step 715. If there is the DL DCI format, it can be appreciated that the terminal may know that the flexible subframe is used for downlink transmission. The terminal receives a non-period channel information request from the flexible subframe provided from the eNodeB in step 712. The reception of a corresponding information request may be performed by a UL grant through PDCCH decoding as in step 711. The UL grant may be restricted by requesting only non-period channel information without PUSCH data. The terminal measures non-period channel information from a corresponding flexible subframe in step 713. The terminal transmits non-period channel information according to a request of non-period channel information through a UL grant at step 712 through an uplink subframe appearing after an (n+4) subframe in step 714. For example, if the subframe #4 is set as a flexible subframe in reference numeral 501 and a small eNodeB uses the flexible subframe for downlink transmission, and the non-period channel information is requested through the flexible subframe, the terminal transmits the non-period channel information through a subframe #2 of a next radio frame. The non-period channel information includes all of channel information sent by upper layer signaling.

Figure 7C:
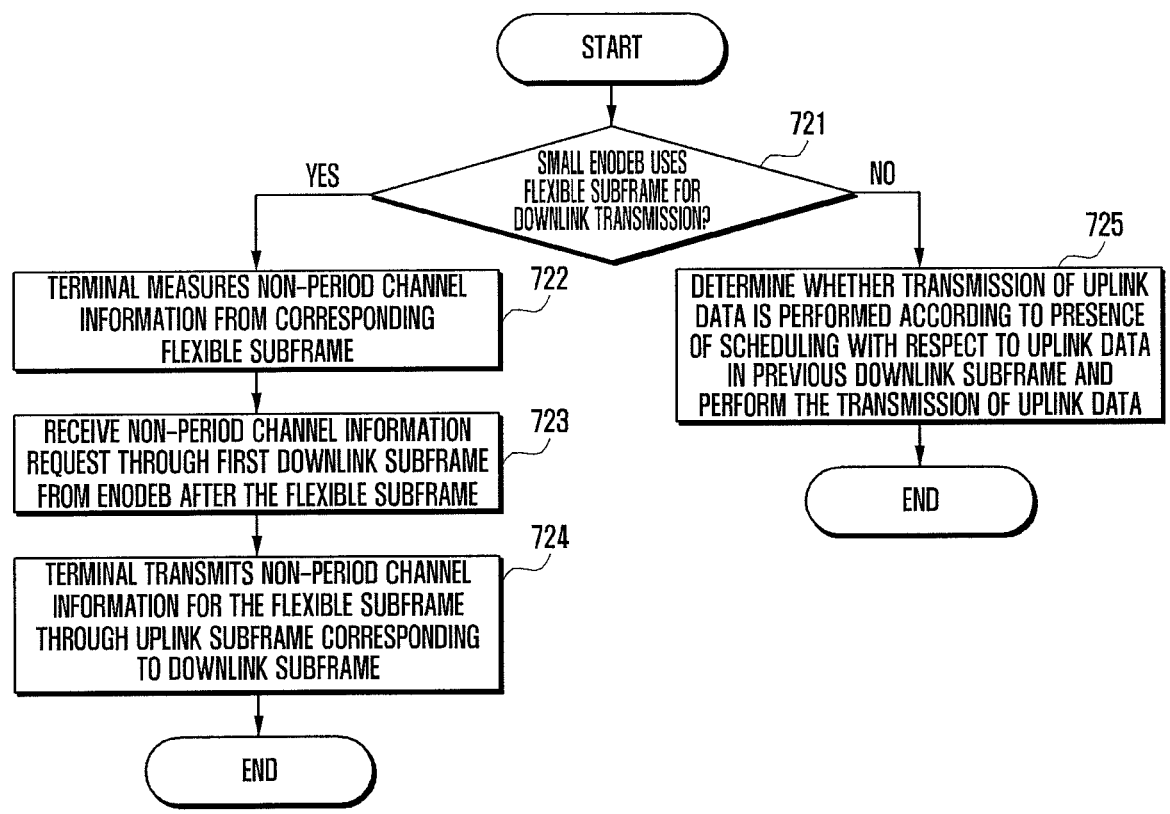

FIG. 7C is a flowchart illustrating a method of transmitting channel information by a terminal of a small eNodeB in a communication system according to a third exemplary embodiment of the present invention. Unlike the first exemplary embodiment of FIG. 7A and FIGS. 8A and 8B, a third exemplary embodiment of FIG. 7C may transmit channel information through a PUSCH.

Referring to FIG. 7C, the terminal determines whether a small eNodeB uses a flexible subframe for downlink transmission in step 721. The corresponding determination decodes a PDCCH in a region which the PDCCH of the flexible subframe may exist to determine whether there is a DL DCI format transmitted to the terminal. If there is no DL DCI format, the terminal determines whether transmission of uplink data is performed according to presence of scheduling with respect to uplink data in a previous downlink subframe and performs the transmission of uplink data in step 725. If there is the DL DCI format, the terminal may know that the flexible subframe is used for downlink transmission. The terminal measures non-period channel information through a corresponding flexible subframe in step 722. The information is measured to be transmitted when non-period channel information for a corresponding flexible subframe is requested. Step 722 may be performed after a next step according to an implementation operation of the terminal. The terminal receives non-period channel information request through a first downlink subframe from an eNodeB after the flexible subframe in step 723. The non-period channel information request is received through the UL grant, and the UL grant may be restricted to requesting only non-period channel information without PUSCH data. The terminal transmits non-period channel information for the flexible subframe through an uplink subframe corresponding to the downlink subframe in step 724. The non-period channel information contains all of channel information sent by upper layer signaling.

Figure 7D:
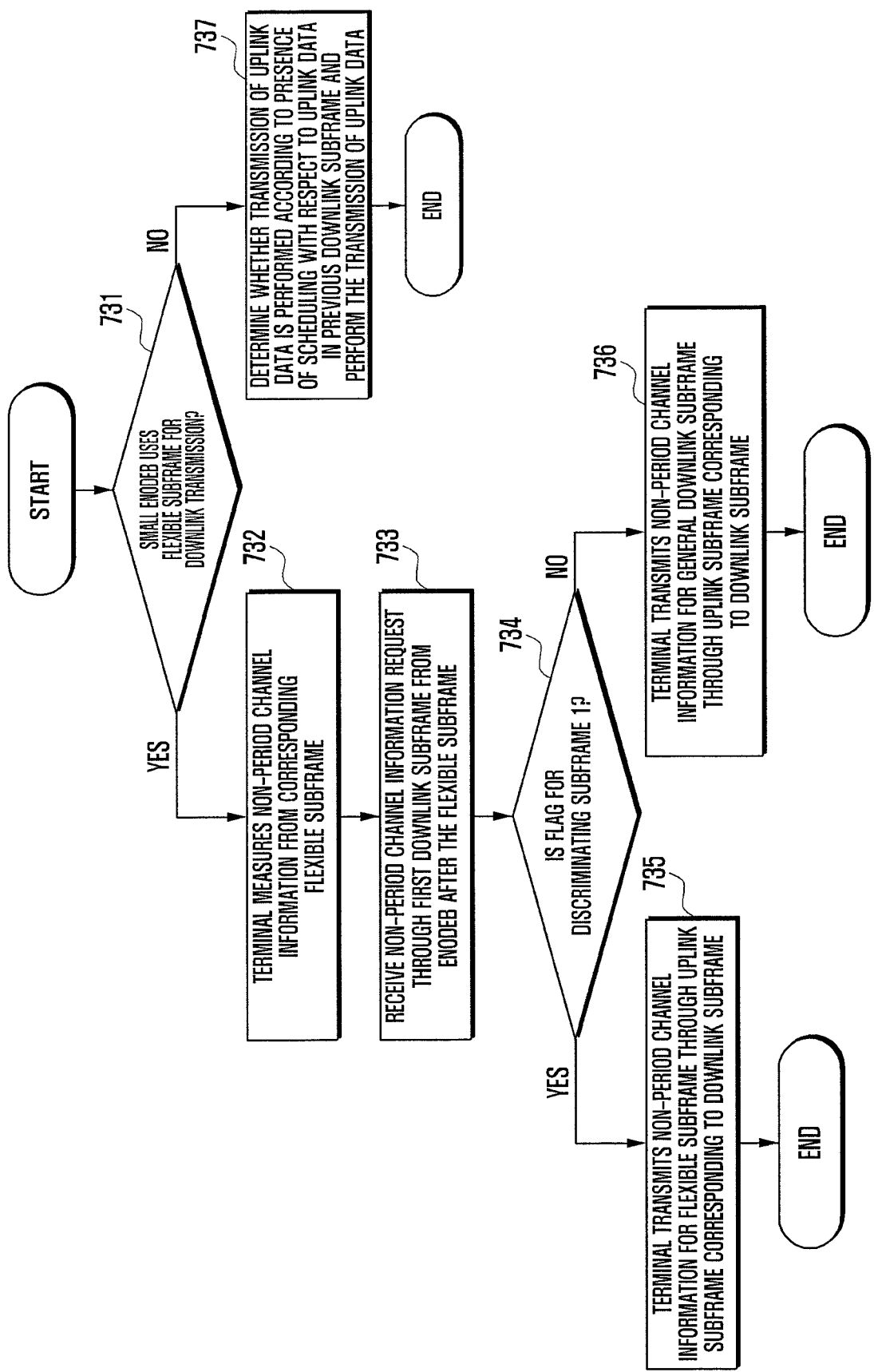

FIG. 7D is a flowchart illustrating a method of transmitting channel information by a terminal of a small eNodeB in a communication system according to a fourth exemplary embodiment of the present invention. Unlike the first exemplary embodiment of FIG. 7A and FIGS. 8A and 8B, a fourth exemplary embodiment of FIG. 7D may transmit channel information through a PUSCH.

Referring to FIG. 7D, the terminal determines whether a small eNodeB uses a flexible subframe for downlink transmission in step 731. The corresponding determination decodes a PDCCH in a region which the PDCCH of the flexible subframe may exist to determine whether there is a DL DCI format transmitted to the terminal. If there is no DL DCI format, the terminal determines whether transmission of uplink data is performed according to presence of scheduling with respect to uplink data in a previous downlink subframe and performs the transmission of uplink data in step 737. If there is the DCI format, it can be appreciated that the terminal may know that the flexible subframe is used for downlink transmission. The terminal measures non-period channel information through a corresponding subframe in step 732. The information is measured to be transmitted when non-period channel information for a corresponding flexible subframe is requested. Step 732 may be performed after a next step according to an implementation operation of the terminal. The terminal receives non-period channel information request through a first downlink subframe from an eNodeB after the flexible subframe in step 733. The request of the non-period channel information is received through a UL grant, and the UL grant may be restricted by requesting only non-period channel information without PUSCH data. The UL grant contains a flag designating whether the non-period channel information request is for a general downlink subframe or the flexible subframe.

Subsequently, it is determined whether a flag for discriminating the subframe is 1 at step 734. If the flag for discriminating the subframe is 1, the terminal transmits non-period channel information for the flexible subframe through an uplink subframe corresponding to the downlink subframe in step 735. The non-period channel information contains all of the channel information sent by upper layer signaling. If the flag for discriminating the subframe is 0, the terminal transmits non-period channel information for a general downlink subframe through an uplink subframe corresponding to the downlink subframe in step 736. The non-period channel information contains all of channel information sent by upper layer signaling.

Figure 9:
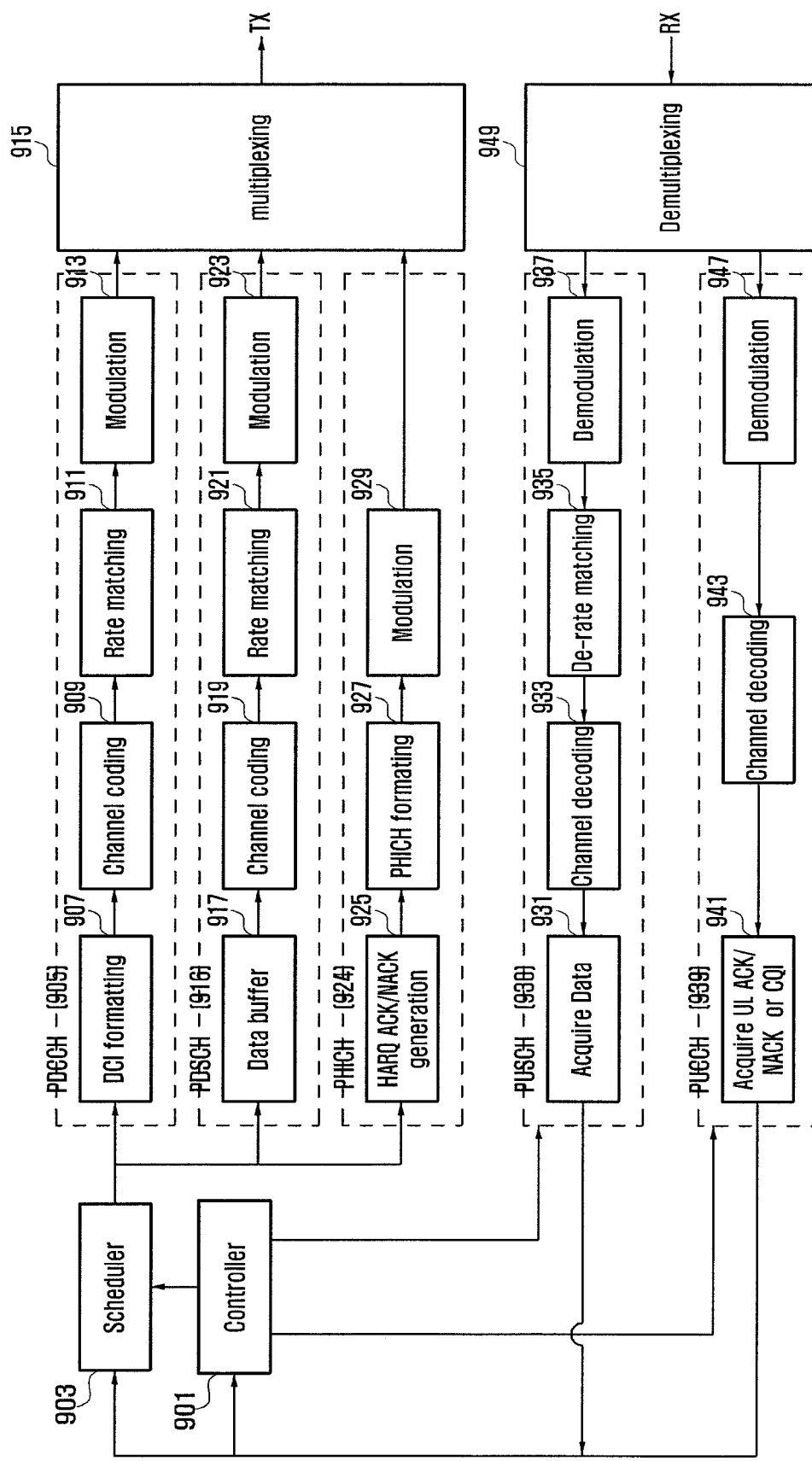
FIG. 9 is a block diagram illustrating an apparatus for operating a sub-frame of an eNodeB in a communication system according to an exemplary embodiment of the present invention.

FIG. 9 is a block diagram illustrating an apparatus for operating a sub-frame of an eNodeB in a communication system according to an exemplary embodiment of the present invention.

Referring to FIG. 9, an eNodeB includes a transmitter composed of a PDCCH block 905, a PDSCH block 916, a PHICH block 924, and a multiplexer 915, a receiver composed of a PUSCH block 930, a PUCCH block 939, and a demultiplexer 949, a controller 901, a scheduler 903. In the transmitter, the PDCCH block 905 includes a DCI formatting unit 907, a channel coding unit 909, a rate matching unit 911, and a modulation unit 913. The PDSCH block 916 include a data buffer 917, a channel coding unit 919, a rate matching unit 921, and a modulation unit 923. The PHICH block 924 includes an HARQ ACK/NACK generation unit 925, a PHICH formatting unit 927, and a modulation unit 929. In the receiver, the PUSCH 930 includes a demodulation unit 937, a de-rate matching unit 935, a channel decoding unit 933, and a data acquiring unit 931. The PUCCH block 939 includes a demodulation unit 947, a channel decoding unit 943, and an ACK/NACK or CQI acquiring unit 941.

The controller 901 reports an amount to be transmitted to the terminal and an amount of a resource available in a system to the scheduler 903 using channel information received from the terminal according to an exemplary embodiment of the present invention.

The PDCCH block 905 configures a DCI under the control of the scheduler 903, error correction performance is added to a DCI in the channel coding unit 909, is rate-matched suited to an amount of a resource to be actually mapped by a rate matching unit 911, is modulated by the modulation unit 913, and is multiplexed with other signals in the multiplexing unit 915.

The PDSCH block 916 extracts data to be transmitted from a data butter 917 under the control of the scheduler 903, error correction performance is added to the extracted data in a channel coding unit 919, is rate-matched suited to an amount of a resource to be actually mapped by a rate matching unit 921, is modulated by the modulation unit 923, and is multiplexed with other signals in the multiplexing unit 915.

The PHICH block 924 generates an HARQ ACK/NACK with respect to a PUSCH received by an HARQ ACK/NACK generation unit 925 from a terminal. The HARQ ACK/NACK is configured so as to be suited to a PHICH channel structure through a PHICH formatting unit 927, is modulated by the modulation unit 929, and is multiplexed with other signals in the multiplexing unit 915.

Further, the multiplexed signals are generated as an Orthogonal Frequency Division Multiplexing (OFDM) signal and the OFDM signal is transmitted to a terminal.

The PUSCH block 930 separates a PUSCH signal from a signal received from a terminal by a demultiplexing unit 949, is demodulated by a demodulation unit 937, symbols prior to rate matching are reconfigured by a de-rate matching unit 935, is decoded by the channel decoding unit 933, and PUSCH data are acquired by the data acquiring unit 931. The data acquiring unit 931 notifies of the presence of an error with respect to a decoding result to the scheduler 903 to adjust generation of HARQ ACK/NACK, and applies the presence of the error with respect to a deciding result to the timing controller 901 to adjust downlink HARQ ACK/NACK timing.

The PUCCH block 939 separates a PUCCH signal from a signal received from a terminal using a demultiplexing unit 949 according to an exemplary embodiment of the present invention, the separated PUCCH signal is demodulated by the demodulation unit 947, the demodulated PUCCH signal is decoded by the channel decoding unit 943, and an uplink ACK/NACK or CQI is acquired by the ACK/NACK or CQI acquiring unit 941. The acquired uplink CQI is applied to a scheduler 903 and is used to determine a transmission Modulation and Coding Scheme (MCS) of the PDSCH.

In this case, in an apparatus for operating a subframe of a macro eNodeB, a controller determines and reports an uplink protection subframe for suppressing uplink transmission to neighboring eNodeBs. Further, the controller transmits scheduling information for a PUSCH through a downlink subframe corresponding to an uplink protection subframe. Here, the controller does not perform scheduling with respect to an uplink protection subframe such that uplink transmission from a terminal of a macro eNodeB is not performed through an uplink protection subframe. For example, when a subframe is operated according to a TDD UL-DL configuration #3, a macro eNodeB does not transmit scheduling information for a PUCCH through a subframe #9 but transmits scheduling information for a PUSCH. In the apparatus for operating a subframe of a small eNodeB, the controller sets an uplink protection subframe reported from a neighboring eNodeB as a flexible subframe. Moreover, the controller uses the flexible subframe for downlink transmission. In this case, the controller analyzes channel information of a flexible subframe received from a terminal of a small eNodeB and uses it to schedule a next flexible subframe.

Figure 10:
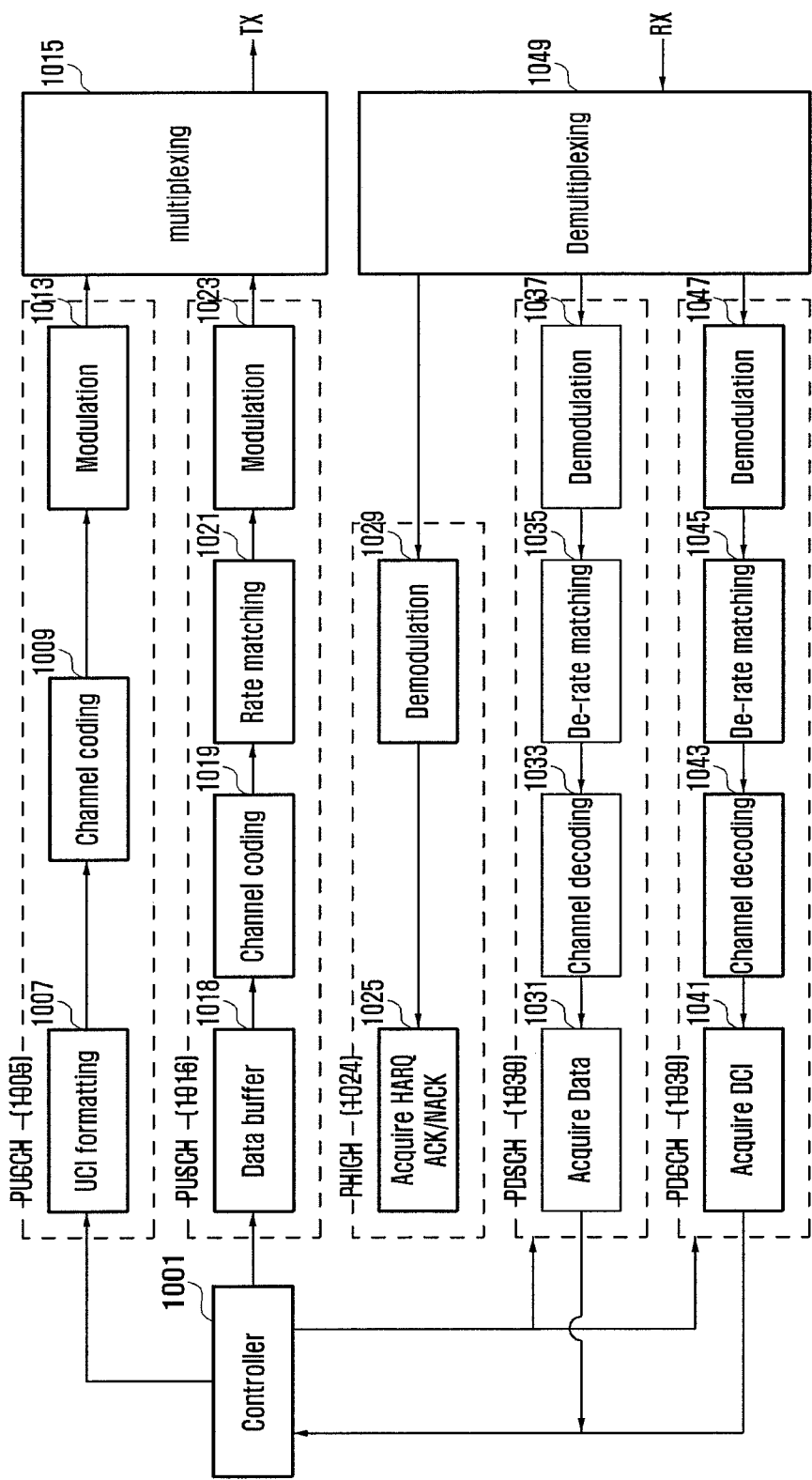
FIG. 10 is a block diagram illustrating an apparatus for transmitting channel information of a terminal in a communication system according to an exemplary embodiment of the present invention.

FIG. 10 is a block diagram illustrating an apparatus for transmitting channel information of a terminal in a communication system according to an exemplary embodiment of the present invention.

Referring to FIG. 10, a terminal includes a transmitter composed of a PUCCH block 1005, a PUSCH block 1016, a multiplexing unit 1015; a receiver composed of a PHICH block 1024, a PDSCH block 1030, a PDCCH block 1039, and a demultiplexer 1049; and a controller 1001. In the transmitter, the PUCCH block 1005 includes a UCI formatting unit 1007, a channel coding unit 1009, a modulation unit 1013. The PUSCH block 1016 includes a data buffer 1018, a channel coding unit 1019, a rate matching unit 1021, and a modulator 1023. In the receiver, the PHICH block 1024 include an HARQ ACK/NACK acquiring unit 1025, and a modulation unit 1029. The PDSCH block 1030 include a demodulation unit 1037, a de-rate matching unit 1035, a channel decoding unit 1033, and a data acquiring unit 1031. PDCCH block 1039 includes a demodulation unit 1047, a de-rate matching unit 1045, a channel decoding unit 1043, and a DCI acquiring unit 1041.

The controller 1001 determines whether a flexible subframe from a DCI received from an eNodeB is used for downlink transmission, and reports the determination result to the PUCCH block 1005, the PUSCH block 1016, the PHICH 1024, the PDSCH 1030, and the PDCCH block 1039 such that they may measure non-period channel information. A method of measuring and transmitting the non-period channel information depends on the foregoing method of the invention.

The PUCCH block 1005 configures a HARQ ACK/NACK or CQI according to an exemplary embodiment of the present invention using Uplink Control Information (UCI) under the control of the controller 1001 by the UCI formatting unit 1007, error correction performance is added to the UCI by the channel coding unit 1009, is modulated by the modulation unit 1013, and is multiplexed with other signals by the multiplexing unit 1015.

The PUSCH block 1016 extracts data to be transmitted from the data buffer 1018, error correction performance is added to the extracted data by the channel coding unit 1019, is rate-matched suited to an amount of a resource to be actually mapped by a rate matching unit 1021, is modulated by the modulation unit 1023, and is multiplexed with other signals in the multiplexing unit 1015.

Moreover, the multiplexed signals are generated as a Single Carrier Frequency Division Multiple Access (SC-FDMA) signal, and the SC-FDMA signal is transmitted to an eNodeB.

The PHICH block 1024 separates a PHICH signal from a signal received from a terminal through a demultiplexing unit 1049, the separated PHICH signal is demodulated by the demodulation unit 1029, and the presence of an HARQ ACK/NACK with respect to the PUSCH is acquired by the HARQ ACK/NACK acquiring unit 1025. The PUSCH block 1030 separates a PUSCH signal from a signal through a flexible subframe received from an eNodeB by a demultiplexing unit 1049, the separated PUSCH signal is demodulated by a demodulation unit 1037, symbols prior to rate matching are reconfigured by a de-rate matching unit 1035, is decoded by the channel decoding unit 1033, and PUSCH data are acquired by the data acquiring unit 1031. The data acquiring unit 1031 reports the presence of an error with respect to a decoding result to the PUCCH block 1005 to adjust generation of an uplink HARQ ACK/NACK.

The PDCCH block 1039 separates a PDCCH signal from a signal received from the eNodeB through the de-multiplexing unit 1049, the separated PDCCH signal is demodulated by the demodulation unit 1047, symbols prior to rate matching are reconfigured by a de-rate matching unit 1045, the demodulated PDCCH signal is decoded by the channel decoding unit 1043, and a DCI is acquired by the DCI acquiring unit 1041.

In this case, in the terminal of the small eNodeB, the controller measures non-period channel information from a flexible subframe used for downlink transmission. Moreover, the controller carries the non-period channel information into at least one uplink subframe. Here, the controller may transmit the non-period channel information through a PUCCH in a preset uplink frame, namely, at least one uplink subframe from a subframe #n+4. However, another flexible subframe after a corresponding flexible subframe is used for uplink transmission, the controller may stop transmission of non-period channel information and again measure the non-period channel information. If the non-period channel information is requested from the small eNodeB through a downlink subframe after the flexible subframe, the controller may transmit non-period channel information through a PUSCH in an uplink subframe corresponding to a downlink subframe. In the meantime, if the non-period channel information is requested from the small eNodeB through the flexible subframe, the controller may measure the non-period channel information. Moreover, the controller may transmit the non-period channel information through a PUSCH in the preset subframe, for example, the subframe #n+4.

Exemplary embodiments of the present invention provide an approach which does not influence resource use of a macro eNodeB while controlling interference a small eNodeB terminal receives from the macro eNodeB. In addition, the exemplary embodiments of the present invention provide an approach of transmitting downlink channel information which the small eNodeB can refer to for scheduling when the small eNodeB uses the flexible subframe for downlink transmission in the TDD system.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A method performed by a terminal in a communication system, the method comprising:

receiving, from a base station, information on a flexible time resource;

receiving, from the base station, downlink control information (DCI) in a first time resource, the DCI including information for requesting channel state information (CSI) reporting;

obtaining aperiodic CSI based on a channel measurement in a second time resource in case of the information for requesting the CSI reporting being set as a first value;

obtaining the aperiodic CSI based on a channel measurement in a third time resource in case that the information for requesting the CSI reporting being set as a second value; and transmitting, to the base station, the aperiodic CSI in a fourth time resource based on the DCI.

2. The method of claim 1, wherein the second time resource and the third time resource are identified as downlink resources based on the information on the flexible time resource.

3. The method of claim 1, wherein the aperiodic CSI includes channel state information of which type is configured by higher layer signaling.

4. The method of claim 1, wherein the first time resource is identified such that the first time resource corresponds to a valid downlink resource.

5. A method performed by a base station in a communication system, the method comprising:

transmitting, to a terminal, information on a flexible time resource;

transmitting, to the terminal, downlink control information (DCI) in a first time resource, the DCI including information for requesting channel state information (CSI) reporting; and receiving, from the terminal, an aperiodic CSI in a fourth time resource based on the DCI, wherein the aperiodic CSI is obtained based on a channel measurement in a second time resource in case of the information for requesting the CSI reporting being set as a first value and is obtained based on a channel measurement in a third time resource in case of the information for requesting the CSI reporting being set as a second value.

6. The method of claim 5, wherein the second time resource and the third time resource are identified as downlink resources based on the information on the flexible time resource.

7. The method of claim 5, wherein the aperiodic CSI includes channel state information of which type is configured by higher layer signaling.

8. The method of claim 5, wherein the first time resource is identified such that the first time resource corresponds to a valid downlink resource.

9. A terminal in a communication system, the terminal comprising:

a transceiver; and a controller configured to:

receive, from a base station via the transceiver, information on a flexible time resource, receive, from the base station via the transceiver, downlink control information (DCI) in a first time resource, the DCI including information for requesting channel state information (CSI) reporting, obtain aperiodic CSI based on a channel measurement in a second time resource in case of the information for requesting the CSI reporting being set as a first value, obtain the aperiodic CSI based on a channel measurement in a third time resource in case that the information for requesting the CSI reporting being set as a second value, and transmit, to the base station via the transceiver, the aperiodic CSI in a fourth time resource based on the DCI.

10. The terminal of claim 9, wherein the second time resource and the third time resource are identified as downlink resources based on the information on the flexible time resource.

11. The terminal of claim 9, wherein the aperiodic CSI includes channel state information of which type is configured by higher layer signaling.

12. The terminal of claim 9, wherein the first time resource is identified such that the first time resource corresponds to a valid downlink resource.

13. A base station in a communication system, the base station comprising:

a transceiver; and a controller configured to:

transmit, to a terminal via the transceiver, information on a flexible time resource, transmit, to the terminal via the transceiver, downlink control information (DCI) in a first time resource, the DCI including information for requesting channel state information (CSI) reporting, and receive, from the terminal via the transceiver, an aperiodic CSI in a fourth time resource based on the DCI, wherein the aperiodic CSI is obtained based on a channel measurement in a second time resource in case of the information for requesting the CSI reporting being set as a first value and is obtained based on a channel measurement in a third time resource in case of the information for requesting the CSI reporting being set as a second value.

14. The base station of claim 13, wherein the second time resource and the third time resource are identified as downlink resources based on the information on the flexible time resource.

15. The base station of claim 13, wherein the aperiodic CSI includes channel state information of which type is configured by higher layer signaling.

16. The base station of claim 13, wherein the first time resource is identified such that the first time resource corresponds to a valid downlink resource.

* * * * *